United States Patent
Okawa et al.

(10) Patent No.: US 9,691,347 B2
(45) Date of Patent: Jun. 27, 2017

(54) IMAGE PROCESSING APPARATUS, IMAGE PROCESSING METHOD, DISPLAY PANEL DRIVER AND DISPLAY APPARATUS

(71) Applicant: Synaptics Japan GK, Tokyo (JP)

(72) Inventors: Masaaki Okawa, Tokyo (JP); Takashi Nose, Tokyo (JP); Hirobumi Furihata, Tokyo (JP); Akio Sugiyama, Tokyo (JP); Yoshiki Kurokawa, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 14/617,806

(22) Filed: Feb. 9, 2015

(65) Prior Publication Data

US 2015/0228090 A1    Aug. 13, 2015

(30) Foreign Application Priority Data

Feb. 10, 2014   (JP) .................................. 2014-023878

(51) Int. Cl.
| | |
|---|---|
| G06T 11/00 | (2006.01) |
| G06T 3/40 | (2006.01) |
| G09G 5/02 | (2006.01) |
| G09G 5/06 | (2006.01) |
| H04N 1/60 | (2006.01) |
| H04N 5/57 | (2006.01) |
| H04N 5/202 | (2006.01) |
| H04N 9/64 | (2006.01) |

(52) U.S. Cl.
CPC ................. *G09G 5/02* (2013.01); *H04N 1/60* (2013.01); *H04N 1/6027* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,459,500 | B1* | 10/2002 | Takaoka | H04N 1/58 358/1.2 |
| 2003/0053689 | A1* | 3/2003 | Watanabe | G06T 5/004 382/167 |
| 2008/0088857 | A1* | 4/2008 | Zimmer | H04N 1/56 358/1.6 |
| 2010/0013748 | A1* | 1/2010 | Cok | H04N 9/67 345/83 |
| 2011/0187735 | A1* | 8/2011 | Kondoh | G09G 3/2003 345/589 |

(Continued)

FOREIGN PATENT DOCUMENTS

| | | |
|---|---|---|
| JP | H06-339017 A | 12/1994 |
| JP | 2010-079119 A | 4/2010 |

*Primary Examiner* — Wesner Sajous
(74) *Attorney, Agent, or Firm* — Patterson + Sheridan, LLP

(57) ABSTRACT

An image processing apparatus includes a reference value calculating section configured to generate a value that is a weighted average of values of R data, G data, and B data of original RGB data as a reference value. Regarding each of color data such as the R data, the G data, and the B data, a value is calculated that is coincident with a value obtained by adding the value of the color data of the original RGB data to a product of a difference obtained by subtracting the reference value from the value of the color data of the original RGB data and a predetermined coefficient, as a value of the color data of RGB data after saturation expansion.

20 Claims, 17 Drawing Sheets
(5 of 17 Drawing Sheet(s) Filed in Color)

(56) References Cited

U.S. PATENT DOCUMENTS

2011/0285746 A1* 11/2011 Swic .................. G09G 5/02
                                                                           345/597
2015/0093027 A1* 4/2015 Hasegawa .............. G06T 5/002
                                                                           382/167

\* cited by examiner

BRIGHTNESS OF COLOR THICK PORTION
(PORTION A) DECLINES AND
THE PORTION BECOMES DARK

SAVING BRIGHTNESS

○ : VERTEXES OF DEFAULT COLOR AREA
● : VERTEXES USER TARGET COLOR AREA

IMAGE PROCESSING APPARATUS, IMAGE PROCESSING METHOD, DISPLAY PANEL DRIVER AND DISPLAY APPARATUS

CROSS-REFERENCE

This application is based on and claims the benefit of priority from Japanese Patent Application No. JP 2014-023878, filed Feb. 10, 2014. The disclosure thereof is incorporated herein by reference.

TECHNICAL FIELD

The present invention is related to an image processing apparatus, an image processing method, a display panel driver and a display apparatus, especially to an image processing apparatus and an image processing method, which carry out operation processing to expand the saturation of image data corresponding to a display image, and a display panel driver and a display apparatus using the same.

BACKGROUND ART

In a display apparatus in which a color area is relatively narrow, there is a case that operation processing of expanding (emphasizing) the saturation (hereinafter, to be referred to as "saturation expansion processing") is carried out to image data corresponding to a display image. For example, a liquid crystal display apparatus, which uses white illumination as backlight, is narrow in a color area, compared with a wider color area of an OLED (organic light emitting diode) display apparatus in recent years. An OLED display apparatus is sometimes required to expand the color area in order to show the colors more beautifully. One technique of expanding the color area is to thicken the color of a filter for each pixel of the liquid crystal display panel. However, in this technique, the light flux of the backlight attenuates largely due to the filter so that the backlight power has to be increased to keep same brightness of the image. On the other hand, if a technique of expanding the color area by carrying out the saturation expansion processing to the image data is used, such a problem can be avoided.

In a computer containing a mobile terminal (mobile system), image data is generally given as RGB data that shows a gray scale level of each of red, green, and blue of a pixel. When the emphasis of saturation is required in a system in which the image data is given as the RGB data, the saturation expansion processing has to be carried out to the RGB data.

As one technique of carrying out the saturation expansion processing to the RGB data, a technique is known that converts the RGB data into HSV data and expands saturation in a HSV color space. The HSV color space is a color space showing a color by hue (H), saturation (S), and value (V), as shown in FIG. 1. FIG. 1 shows a cone HSV color space.

For example, Patent Literature 1 (JP 2010-79119A) discloses one example in which RGB data is converted into HSV data and the saturation is expanded in the HSV color space. In the technique disclosed in Patent Literature 1, HSV data, i.e. saturation data (S), hue data (H), and value data (V) are extracted from the display data in the RGB form. Then, the saturation data (S') after expansion is calculated by multiplying the saturation data (S) by a saturation expansion coefficient k. Moreover, the HSV data that contains the saturation data (S') after expansion, the hue data (H), and the value data (V) is converted into the RGB data, and the RGB data is outputted as the display data after expansion. That is, in Patent Literature 1, the operation processing is carried out in which only saturation component S is expanded while the hue component H and the value component V are saved.

However, one problem in the technique of expanding only the saturation component S while the hue component H and the value component V are saved, as disclosed in Patent Literature 1, is that the brightness declines to darken the image by saturation emphasis.

Note that Patent literature 2 (JP H06-339017A) discloses an apparatus and method of emphasizing the saturation of a color image, as another technique. The method of emphasizing the saturation disclosed in Patent Literature 2 emphasizes the saturation of the image by multiplying a difference between a maximum value I of the R value, the G value and the B value of each pixel of a color image and each of the R value, the G value and the B value by an emphasis coefficient, and setting a value obtained by subtracting the multiplying result from the maximum value I, as a corresponding one of the R value, the G value and the B value.

SUMMARY OF THE INVENTION

In an embodiment, an image processing apparatus comprises a reference value calculating section, a first operation section, a second operation section, and a third operation section. The a reference value calculating section is configured to generate a value that is a weighted average of values of R data, G data, and B data of original RGB data as a reference value. The first operation section is configured to calculate a first value comprising R data of RGB data after saturation expansion, the first value being coincident with a value obtained by adding the value of the R data of the original RGB data to a product of a first difference obtained by subtracting the reference value from the value of the R data of the original RGB data and a coefficient. The second operation section is configured to calculate a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient. The third operation section is configured to calculate a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient.

In another embodiment, a display panel driver used to drive a display panel comprises a saturation expansion circuit and a drive circuit section. The saturation expansion circuit is configured to carry out saturation expansion processing to original RGB data to generate RGB data after saturation expansion. The drive circuit section is configured to drive said display panel in response to the RGB data after saturation expansion. The saturation expansion circuit comprises an image processing apparatus as described in the embodiment above.

In another embodiment, a display apparatus comprises a display panel and a display panel driver configured to drive the display panel. The display panel driver comprises a saturation expansion circuit and a drive circuit. The saturation expansion circuit configured to carry out saturation expansion processing to original RGB data to generate RGB data after saturation expansion. The drive circuit is configured to drive said display panel in response to the RGB data after saturation expansion. The saturation expansion circuit comprises an image processing apparatus as described in the embodiment above.

In another embodiment, an image processing method comprises: generating a value that is a weighted average of values of R data, G data, and B data of original RGB data, as a reference value; calculating a first value comprising R data of RGB data after saturation expansion, the first value being coincident with a value obtained by adding the value of the R data of the original RGB data to a product of a first difference obtained by subtracting the reference value from the value of the R data of the original RGB data and a predetermined coefficient; calculating a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient; and calculating a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
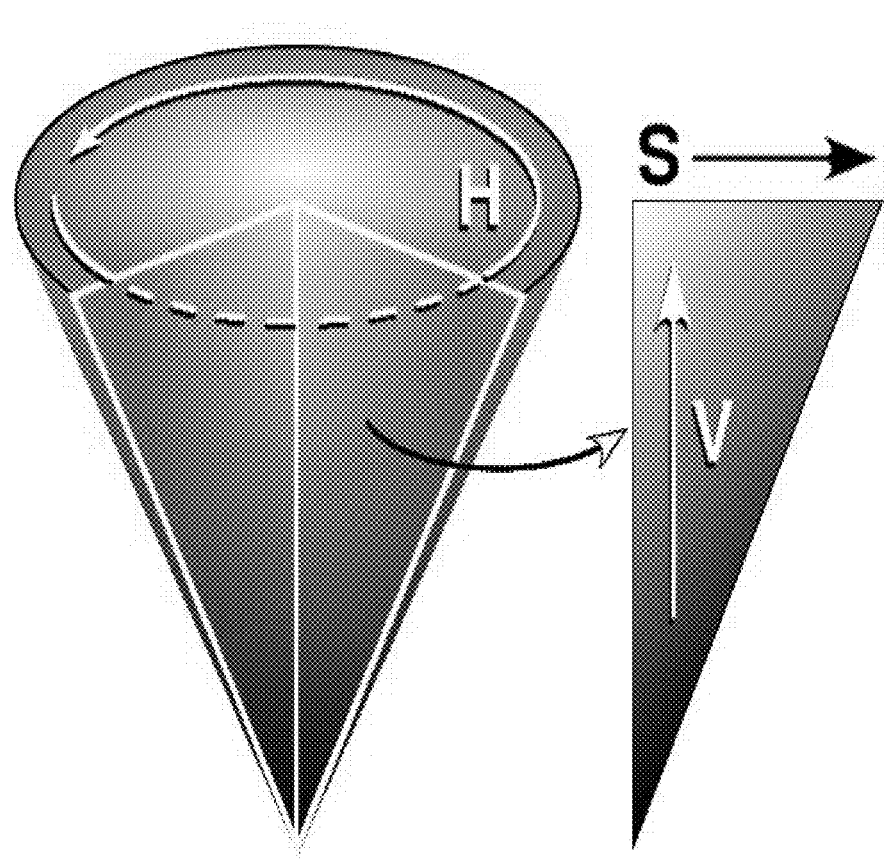
FIG. 1 is a diagram conceptually showing an HSV color space.

Embodiments of the present invention provide a technique of expand saturation of an image while restraining brightness degradation.

Other features of the present invention will become clear from the description and the attached drawings of this Specification.

In one aspect of the present invention, an image processing apparatus includes a section for generating a value that is a weighted average of values of R data, G data, and B data of original RGB data as a reference value; a section for calculating a first value that is coincident with a value obtained by adding the value of the R data of the original RGB data to a product of a first difference obtained by subtracting the reference value from the value of the R data of the original RGB data and a predetermined coefficient, as a value of R data of RGB data after saturation expansion; a section for calculating a second value that is coincident with a value obtained by adding the value of the G data of the original RGB data to a product of a second difference obtained by subtracting the reference value from the value of the G data of the original RGB data and the coefficient, as a value of G data of the RGB data after saturation expansion; and a section for calculating a third value that is coincident with a value obtained by adding the value of the B data of the original RGB data to a product of a third difference obtained by subtracting the reference value from the value of the B data of the original RGB data and the coefficient, as a value of B data of the RGB data after saturation expansion.

Each of the above-mentioned sections may be realized in hardware, may be realized using software program, and may be realized by a combination of the hardware and the software program.

In another aspect of the present invention, the image processing apparatus includes a reference value calculating section configured to generate a value that is a weighted average of values of R data, G data, and B data of original RGB data, as a reference value; a first operation section configured to calculate a first value that is coincident with a value obtained by adding the value of the R data of the original RGB data to a product of a first difference obtained by subtracting the reference value from the value of the R data of the original RGB data and a predetermined coefficient, as a value of R data of RGB data after saturation expansion; a second operation section configured to calculate a second value that is coincident with a value obtained by adding the value of the G data of the original RGB data to a product of a second difference obtained by subtracting the reference value from the value of the G data of the original RGB data and the coefficient, as a value of G data of the RGB data after saturation expansion; and a third operation section configured to calculate a third value that is coincident with a value obtained by adding the value of the B data of the original RGB data to a product of a third difference obtained by subtracting the reference value from the value of the B data of the original RGB data and the coefficient, as a value of B data of the RGB data after saturation expansion.

In another aspect of the present invention, a display panel driver used to drive a display panel, includes: a saturation expansion circuit configured to carry out saturation expansion processing to original RGB data to generate RGB data after saturation expansion; and a drive circuit section configured to drive the display panel in response to the RGB data after saturation expansion. The saturation expansion circuit includes: a reference value calculating circuit configured to generate a value that is a weighted average of values of R data, G data, and B data of the original RGB data as a reference value; a first operation section configured to calculate a first value that is coincident with a value obtained by adding the value of the R data of the original RGB data to a product of a first difference obtained by subtracting the reference value from the value of the R data of the original RGB data and a predetermined coefficient, as a value of R data of RGB data after saturation expansion; a second operation section configured to calculate a second value that is coincident with a value obtained by adding the value of the G data of the original RGB data to a product of a second difference obtained by subtracting the reference value from the value of the G data of the original RGB data and the coefficient as a value of G data of the RGB data after saturation expansion; and a third operation section configured to calculate a third value that is coincident with a value obtained by adding the value of the B data of the original RGB data to a product of a third difference obtained by subtracting the reference value from the value of the B data of the original RGB data and the coefficient, as a value of B data of the RGB data after saturation expansion.

In a further different aspect of the present invention, a display apparatus includes the display panel and the display panel driver having the above-mentioned configuration.

An image processing method includes: generating a value that is a weighted average of values of R data, G data, and B data of original RGB data, as a reference value; calculating a first value that is coincident with a value obtained by adding the value of the R data of the original RGB data to a product of a first difference obtained by subtracting the reference value from the value of the R data of the original RGB data and a predetermined coefficient, as a value of R data of RGB data after saturation expansion; calculating a second value that is coincident with a value obtained by adding the value of the G data of the original RGB data to a product of a second difference obtained by subtracting the reference value from the value of the G data of the original RGB data and the coefficient, as a value of G data of the RGB data after saturation expansion; and calculating a third value that is coincident with a value obtained by adding the value of the B data of the original RGB data to a product of a third difference obtained by subtracting the reference value from the value of the B data of the original RGB data and the coefficient, as a value of B data of the RGB data after saturation expansion.

In another aspect of the present invention, a program stored in a recording medium makes an operation apparatus operate as a section for generating a value that is a weighted average of values of R data, G data, and B data of original RGB data as a reference value; a section for calculating a first value that is coincident with a value obtained by adding the value of the R data of the original RGB data to a product of a first difference obtained by subtracting the reference value from the value of the R data of the original RGB data and a predetermined coefficient, as a value of R data of RGB data after saturation expansion; a section for calculating a second value that is coincident with a value obtained by adding the value of the G data of the original RGB data to a product of a second difference obtained by subtracting the reference value from the value of the G data of the original RGB data and the coefficient, as a value of G data of the RGB data after saturation expansion; and a section for calculating a third value that is coincident with a value obtained by adding the value of the B data of the original RGB data to a product of a third difference obtained by subtracting the reference value from the value of the B data of the original RGB data and the coefficient, as a value of B data of the RGB data after saturation expansion.

According to the present invention, a technique is provided that expands the saturation of the image while restraining the brightness degradation.

Below, various embodiments of the present invention will be described. Note that an identical or corresponding component is referred to by use of an identical or corresponding reference number or symbol in the following description.

In order to facilitate the understanding of technical features of the present invention, first, a calculating operation of expanding (emphasizing) only the saturation component S in an HSV color space while saving the hue component H and the value component V, and a problem of the operation, as disclosed in Patent Literature 1 will be described.

Figure 2:
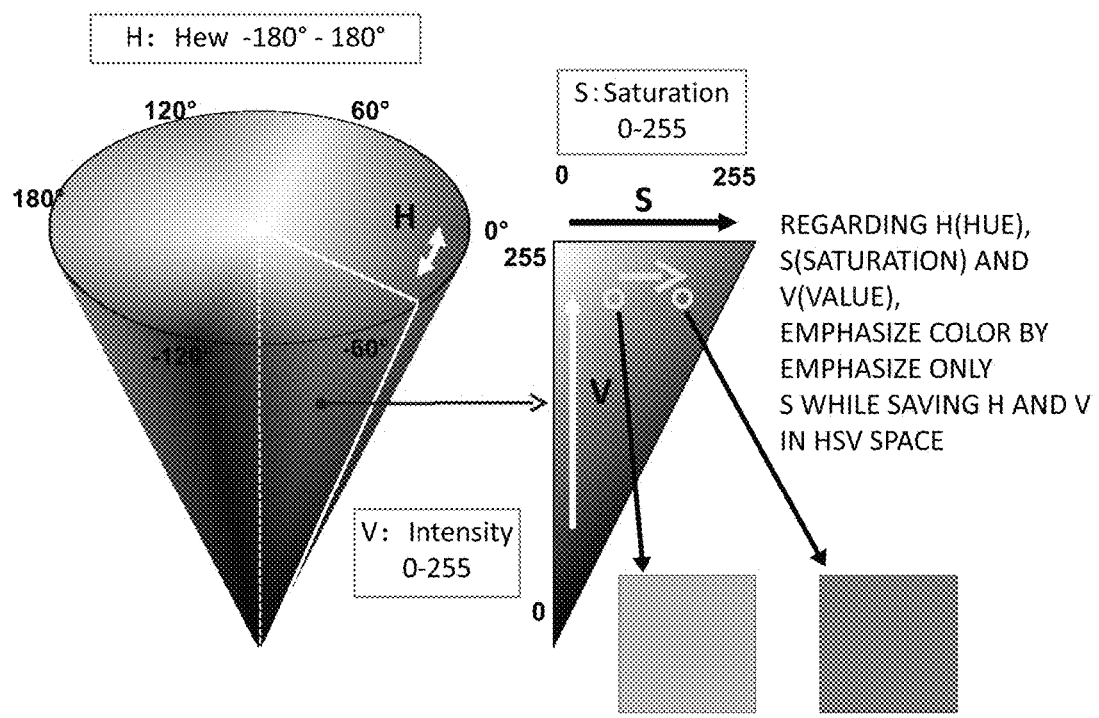
FIG. 2 is a conceptual diagram showing a technique of expanding saturation while saving or retaining hue and value in the HSV color space.

FIG. 2 is a conceptual diagram showing a technique of expanding the saturation in an HSV color space. It is possible to expand the saturation component S while saving or retaining the hue component H and the value component V, by carrying out a desired operation to the saturation component S, because the saturation component S exists as an independent axis in the HSV color space. For example, supposing that a value of saturation data (data showing saturation) of the original HSV data is S, a component of the saturation data of the HSV data after expansion is S', and a saturation expansion rate is k, the saturation can be expanded by the following equation (1):

$$S'=k \cdot S \qquad (1)$$

However, the maximum value of the saturation data S' after expansion must be limited to the value component V of the value data (data indicating the value) of the original HSV data. That is, when the saturation is expanded by the equation (1), the saturation data S' after expansion must be set to the value component V in case that k·S exceeds the value component V of the value data.

Moreover, the HSV color space further has a feature that there is compatibility between the RGB space and a filling region. This means that a 1:1 conversion between the RGB data and the HSV data can be performed. For example, because there is a region not corresponding to the RGB space in a YCbCr space used generally in the TV broadcasting, it is necessary to carry out complicated operation (e.g. clipping processing) when YCbCr data should be converted into the RGB data. On the other hand, because it is possible to convert an optional point in the HSV color space into a point in the RGB space by a simple operation without carrying out the clipping and so on, the conversion between the RGB data and the HSV data is can be performed. And, a conversion operation from an optional point in the RGB space into a point in the HSV color space can also be performed.

The technique of converting the RGB data into the HSV data and expanding the saturation in the HSV color space utilizes these two advantages effectively. As shown to FIG. 3, the saturation can be easily expanded in the image data of the RGB form by converting the RGB data into the HSV data, expanding the saturation in the HSV color space, and converting the HSV data with the saturation expanded into the RGB data again. Such features are advantageous, especially in case of implementing at a low cost, e.g. installing into a liquid crystal panel driver.

For example, the conversion from the RGB data to the HSV data is carried out according to the following equations (1-1) to (1-5).

$$V = \text{MAX} \quad (1\text{-}1)$$

$$S = \text{MAX} - \text{MIN} \quad (1\text{-}2)$$

$$H = \begin{cases} 60 \times \dfrac{G-B}{\text{MAX} - \text{MIN}} + 0, & \text{if MAX} = R \quad (1\text{-}3) \\ 60 \times \dfrac{B-R}{\text{MAX} - \text{MIN}} + 120, & \text{if MAX} = G \quad (1\text{-}4) \\ 60 \times \dfrac{R-G}{\text{MAX} - \text{MIN}} + 240, & \text{if MAX} = B \quad (1\text{-}5) \end{cases}$$

where V is a value of the value data of the HSV data, S is a value of the saturation data and H is a value of the hue data (data indicating hue). Also, R is a value of the R data (data indicating a red gray scale) of the RGB data, G is a value of the G data (data indicating a green gray scale), and B is a value of the B data (data indicating a blue gray scale). Also, MAX is a maximum value of the values R, G, and B and MIN is a minimum value of the values R, G, and B. Here, regarding the equations (1-3) to (1-5), the hue data H is calculated according to the equation (1-3) when the maximum value of the values R, G, and B is R, the hue data H is calculated according to the equation (1-4) when the maximum value thereof is G, and the hue data H is calculated according to the equation (1-5) when the maximum value thereof is B.

For example, also, the conversion from the HSV data to RGB data is carried out according to the following equations (2-1) to (2-11):

$$Hi = \text{mod}\left(\text{int}\left(\dfrac{H}{60}\right), 6\right) \quad (2\text{-}1)$$

$$f = H/60 - Hi \quad (2\text{-}2)$$

$$p = V - S \quad (2\text{-}3)$$

$$q = V - f \cdot S \quad (2\text{-}4)$$

$$t = V - S + f \cdot S \quad (2\text{-}5)$$

$$R = V, G = t, B = p \quad \text{if } Hi = 0 \quad (2\text{-}6)$$

$$R = q, G = V, B = p \quad \text{if } Hi = 1 \quad (2\text{-}7)$$

$$R = p, G = V, B = t \quad \text{if } Hi = 2 \quad (2\text{-}8)$$

$$R = p, G = q, B = V \quad \text{if } Hi = 3 \quad (2\text{-}9)$$

$$R = t, G = p, B = V \quad \text{if } Hi = 4 \quad (2\text{-}10)$$

$$R = V, G = p, B = q \quad \text{if } Hi = 5 \quad (2\text{-}11)$$

where mod(a,b) is a function showing a remainder when a is divided by b, and int(c) is a function showing a largest integer that does not exceed c.

Figure 4:
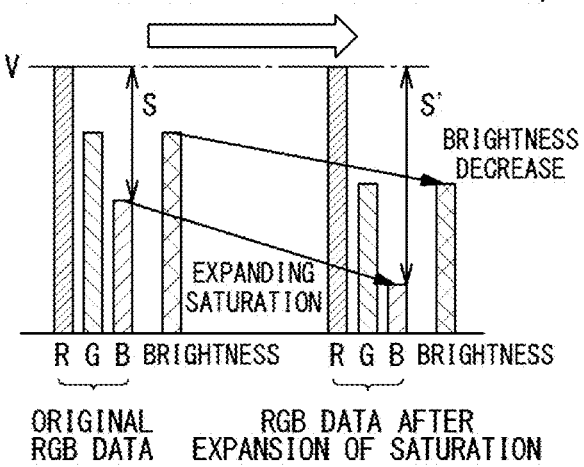
FIG. 4 is a conceptual diagram showing brightness declination through the saturation expansion processing on the HSV color space of FIG. 3.
Figure 5:
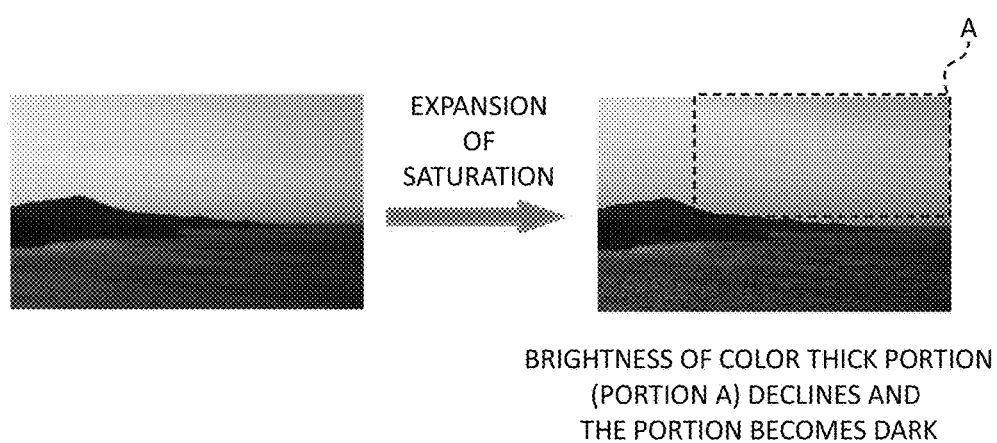
FIG. 5 is an image showing an example in which the brightness of pixels declines in a portion where the color becomes thick in the saturation expansion processing, so that the image becomes dark.

In the technique of converting the RGB data into the HSV data, expanding the saturation in the HSV color space and converting the HSV data with saturation expanded into the RGB data again, the saturation component S (that is, MAX−MIN in the equation (1-2)) is increased while saving the value component V (that is, MAX of the equation (1-1)). However, in such a technique, the maximum value of the R data, the G data, and the B data become small in value so that the brightness of the pixel declines. For example, as shown in FIG. 4, when the R data of the R data, the G data, and the B data of original RGB data is the maximum, the R data is maintained or retained just as it is in the RGB data after saturation expansion. However, the G data and the B data become small as the saturation is expanded. This means that a problem occurs in which the obtained image seems dark when the saturation is strongly expanded (that is, emphasize a color strongly). FIG. 5 shows an example that the brightness of pixels in a portion where the color is deep, i.e. a portion A declines as the result of the saturation expansion so that the image becomes dark.

In embodiments of the present invention that will be described below, a technique of preventing or restraining declination of brightness when the saturation is expanded is provided.

The saturation expansion processing is carried out as follows in the embodiments of the present invention. First, a weighted average of the values R, G, and B of the R data, the G data, and the B data of the original RGB data, is generated as a reference value C. Here, note that in this Specification, the calculation of "the weighted average" includes a calculation when the weighting coefficients of two or all of the values R, G, and B are identical, and a calculation when the weighting coefficients of the values R, G, and B are changed according to the magnitudes of the values R, G, and B, in addition to a calculation when the weighting coefficients assigned to the values R, G, and B are different from each other.

Moreover, a first value, which is equal to a value obtained by adding the value R of the R data of the original RGB data to a product of a predetermined coefficient α and a difference dCR obtained by subtracting the reference value C from the value R of the R data of the original RGB data, is calculated as a value R' of the R data of the RGB data after saturation expansion. Here, the predetermined coefficient α is a value that is determined, depending on a desired saturation expansion rate k. In the embodiment, a value obtained by subtracting "1" from the desired saturation expansion rate k is given as the coefficient α.

A second value, which is equal to a value obtained by adding the value G of the G data of the original RGB data to a product of the coefficient α and a difference dCG obtained by subtracting the reference value C from the value G of the G data of the original RGB data, is calculated as a value G' of the G data of the RGB data after saturation expansion.

A third value, which is equal to a value obtained by adding the value B of the B data of the original. RGB data to a product of the coefficient α and a difference dCB obtained by subtracting the reference value C from the value B of the B data of the original RGB data, is calculated as a value B' of the B data of the RGB data after saturation expansion.

According to such saturation expansion processing, the saturation can be expanded while saving or retaining the reference value C (not the value component V). Because the reference value C, which is given as the weighted average when the weighting coefficients to the values R, G, and B of the R data, the G data, and the B data are appropriately selected, can be set to a value corresponding to the brightness Y, brightness declination can be restrained through calculation in which the reference value C is saved.

In this case, note that the calculation of "the first value that is equal to the value obtained by adding the value R of the R data of the original RGB data to a product of the predetermined coefficient α and the difference dCR obtained by subtracting the reference value C from the value R of the R data of the original RGB data" may be carried out by various methods.

For example, in case of calculation of the above first value, the difference dCR, a product, of the difference dCR and the predetermined coefficient α, and the value obtained by adding the product to the value R of the R data of the original RGB data may be actually calculated respectively. That is, the first value, i.e. the value R' of the R data of the RGB data after saturation expansion may be calculated by using the following equations (3-1) and (3-2):

$$dCR = R - C \quad (3\text{-}1)$$

$$R' = R + \alpha \cdot dCR \quad (3\text{-}2)$$

In this case, the equation (3-2) can be transformed as follows:

$$\begin{aligned} R' &= R + \alpha \cdot (R - C) \\ &= (1 + \alpha)R - \alpha \cdot C \end{aligned} \quad (3\text{-}3)$$

Accordingly, the value R' of the R data of the RGB data after saturation expansion may be calculated by using the equation (3-3).

In the sane way, note that the calculation of "the second value that is equal to the value obtained by adding the value G of the G data of the original RGB data to a product of the predetermined coefficient α and the difference dCG obtained by subtracting the reference value C from the value G of the G data of the original RGB data" may be carried out by various methods.

Moreover, note that the calculation of "the third value that is equal to a value obtained by adding the value B of the B data of the original RGB data to a product of the predetermined coefficient α and the difference dCB obtained by subtracting the reference value C from the value B of the B data of the original RGB data" may be carried out by various methods.

In the embodiment, the brightness Y may be used as the reference value C. Here, note that the brightness Y is a value that is given as the weighted average of the values R, G, and B of the R data, the G data, and the B data. When the brightness Y is used as the reference value C, the saturation is expanded while saving or retaining the brightness Y.

In another embodiment, the weighted average of the brightness Y and the value component V is used as the reference value C. In this case, note that because the brightness Y is the weighted average of the values R, G, and B of the R data, the G data, and the B data, and the value component V is the maximum value of the values R, G, and B, the weighted average of the brightness Y and the value component V is a weighted average of the values R, G, and B of the R data, the G data, and the B data.

The saturation expansion processing of the present embodiment may be carried out in hardware and may be carried out based on a software program that contains code that executes the saturation expansion processing of the present embodiment. Also, the saturation expansion processing of the present embodiment may be carried out in a combination of the hardware and the software. When the saturation expansion processing of the present embodiment is carried out based on the software program, the above-mentioned saturation expansion processing may be executed by a processing unit (computer) when the software program may be executed by the processing unit. The software program may be recorded in a non-transitory recording medium. Below, the more specific embodiment of the present invention will be described.

[First Embodiment]

Figure 6:
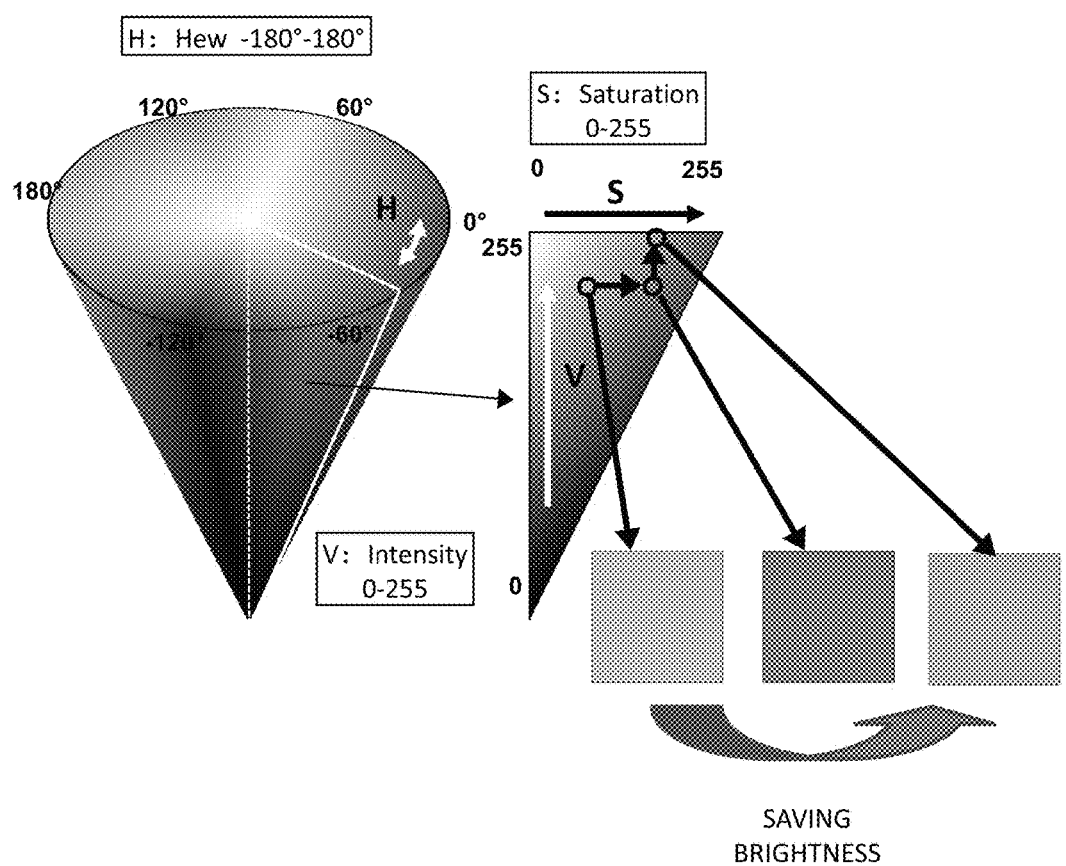
FIG. 6 is a conceptual diagram showing the saturation expansion processing carried out in a first embodiment of the present invention.

FIG. 6 is a conceptual diagram showing the saturation expansion processing that is carried out in a first embodiment. In the saturation expansion processing of the first embodiment, the operation processing is carried out in which the saturation component S is not expanded while saving the value component V but the saturation component S is expanded while saving the brightness Y. In other words, in the first embodiment, the calculation of expanding the saturation component S is carried out while saving the reference value C, and in the calculation, the brightness Y is used as the reference value C.

Figure 7:
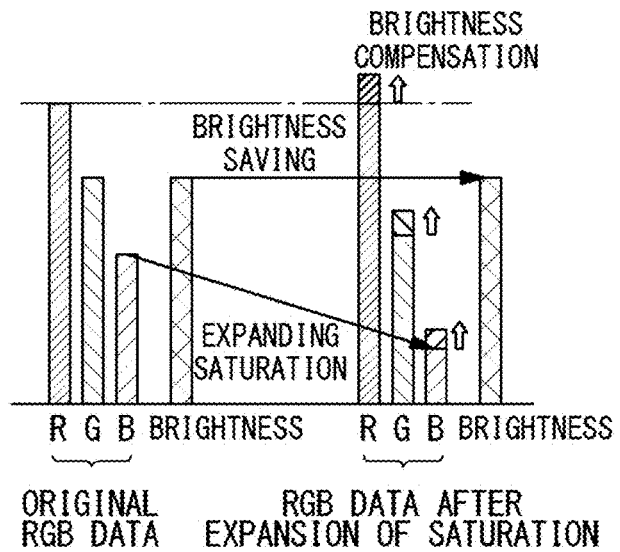
FIG. 7 is a conceptual diagram showing a technical idea of the saturation expansion processing in the first embodiment.
Figure 8:
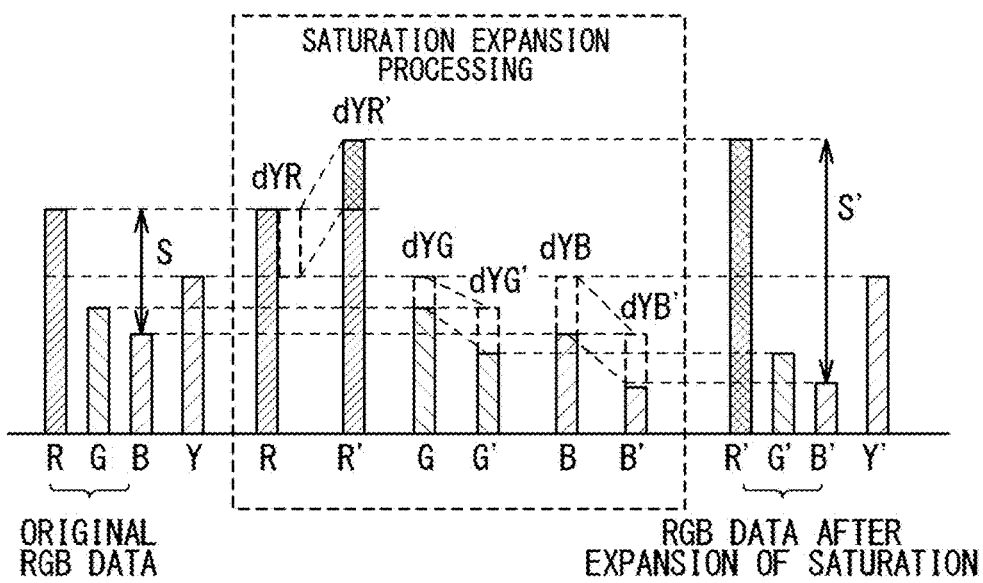
FIG. 8 is a diagram showing an operation of the saturation expansion processing in the first embodiment.

FIG. 7 is a conceptual diagram showing a technical idea of the saturation expansion processing of the present embodiment. In the present embodiment, when the saturation expansion processing is carried out, the brightness compensation is carried out such that the brightness Y is saved to each of the R data, the G data, and the B data, as compared with the saturation expansion processing which saves the value component V. Thus, the brightness Y is maintained. More specifically, the brightness expansion processing is carried out through the following calculations. Note that FIG. 8 is a diagram conceptually showing calculations in the saturation expansion processing of the present embodiment.

First, the brightness Y is calculated as the weighted average of the values of the R data, the G data, and the B data of the original RGB data according to the following equation:

$$Y = aR + bG + cB \quad (4\text{-}1)$$

Here, R, G, and B are the values of the R data, the G data, and the B data of the original RGB data respectively. Also, a, b, and c are respectively the weighting coefficients that are given to the R data, the G data, and the B data. Any of a, b, and c is greater than "0" and all of them meet the following equation:

$$a + b + c = 1 \quad (4\text{-}2)$$

The weighting coefficients a, b and c that are used for the calculation of the brightness Y are variable according to a definition of the brightness Y. For example, in the sRGB standard, the brightness Y is given as follows:

$$Y = 0.2126 \times R + 0.7152 \times G + 0.0722 \times B$$

In this case, the weighting coefficients a, b, and c are determined as follows:
a=0.2126
b=0.7152
c=0.0722
Also, in a YUV table color system, the brightness Y is given as follows:

$$Y=0.299 \times R+0.587 \times G+0.114 \times B$$

In this case, the weighting coefficients a, b, and c are determined as follows:
a=0.299
b=0.587
c=0.114

Moreover, a difference dYR between the R data and the brightness Y, a difference dYG between the data G and the brightness Y, and a difference dYB between the data B and the brightness Y are calculated. The differences dYR, dYG, and dYB are given by the following equations (4-3) to (4-5):

$$dYR=R-Y \qquad (4\text{-}3)$$

$$dYG=G-Y \qquad (4\text{-}4)$$

$$dYB=B-Y \qquad (4\text{-}5)$$

Moreover, values dYR', dYG' and dYB' are calculated by multiplying the differences dYR, dYG, and dYB by the coefficient α. The values dYR', dYG', and dYB' are given by the following equations (4-6) to (4-8):

$$dYR'=\alpha \cdot dYR \qquad (4\text{-}6)$$

$$dYG'=\alpha \cdot dYG \qquad (4\text{-}7)$$

$$dYB'=\alpha \cdot dYB \qquad (4\text{-}8)$$

where the coefficient α is a value which depends on the desired saturation expansion rate k and more specifically, it is the value obtained by subtracting "1" from the saturation expansion rate k. That is, $$\alpha=k-1 \qquad (4\text{-}9)$$

Because k is generally greater than "1" at saturation emphasis, α is a positive number.

The values R', G', and B' of the R data, the G data, and the B data of the RGB data after saturation expansion are calculated by adding the compensation values dYR', dYG', and dYB' to the values R, G, and B of the R data, the G data, and the B data of the original RGB data, respectively. That is, $$R'=R+dYR' \qquad (4\text{-}10)$$

$$G'=G+dYG' \qquad (4\text{-}11)$$

$$B'=G+dYB' \qquad (4\text{-}12)$$

Accordingly, in the present embodiment, the values R', G', and B' of the R data, the G data, and the B data of the RGB data after saturation expansion are calculated according to the following equations:

$$R'=R+\alpha(R-Y) \qquad (4\text{-}13)$$

$$G'=G+\alpha(G-Y) \qquad (4\text{-}14)$$

$$B'=B+\alpha(B-Y) \qquad (4\text{-}15)$$

In the saturation expansion processing of the present embodiment, the values R', G', and B' of the R data, the G data, and the B data of the RGB data after saturation expansion are calculated according to the equations (4-13) to (4-15). In this case, the phrase of "according to the equations (4-13) to (4-15)" means a case of carrying out an operation that is equivalent to an operation using the equations (4-13) to (4-15) in addition to a case of carrying out the operation using the equation (4-13) to (4-15). For example, the equations (4-13) to (4-15) can be transformed into:

$$R'=(1+\alpha)R-\alpha Y \qquad (4\text{-}16)$$

$$G'=(1+\alpha)G-\alpha Y \qquad (4\text{-}17)$$

$$B'=(1+\alpha)B-\alpha Y \qquad (4\text{-}18),$$

or $$R'=kR-(k-1)Y \qquad (4\text{-}19)$$

$$G'=kG-(k-1)Y \qquad (4\text{-}20)$$

$$B'=kB-(k-1)Y \qquad (4\text{-}21)$$

The values R', G', and B' of the R data, the G data, and the B data of the RGB data after saturation expansion may be calculated by using the equations (4-16) to (4-18), or the value R', G', and B' of the R data, the G data, and the B data of the RGB data after saturation expansion may be calculated by using the equations (4-19) to (4-21).

According to such a calculation, the saturation component S' of the RGB data after saturation expansion is expanded to k times of the saturation component. S of the original RGB data. As mentioned above, k is the desired saturation expansion rate, and generally takes a value that is greater than "1". For example, considering a case that the value of the R data of the R data, the G data, and the B data of the original RGB data is maximum and the value of the B data thereof is minimum, the saturation component S of the original RGB data is:

$$S=R-B \qquad (5\text{-}1)$$

On the other hand, the saturation component S' of the RGB data after saturation expansion is:

$$S'=R'-B' \qquad (5\text{-}2)$$

Here, when the equations (4-13) and (4-15) are substituted into the equation (5-2) and it is rewritten, the following equation (5-3) is obtained:

$$\begin{aligned} S' &= R + \alpha(R-Y) - \{B + \alpha(B-Y)\} \\ &= R - B + \alpha \cdot \{(R-Y) - (B-Y)\} \\ &= R - B + \alpha \cdot (R-B) \\ &= k(R-B) \end{aligned} \qquad (5\text{-}3)$$

From the equation (5-3) and the equation (5-1), it could be understood that the following equation holds:

$$S'=kS \qquad (5\text{-}4)$$

Figure 3:
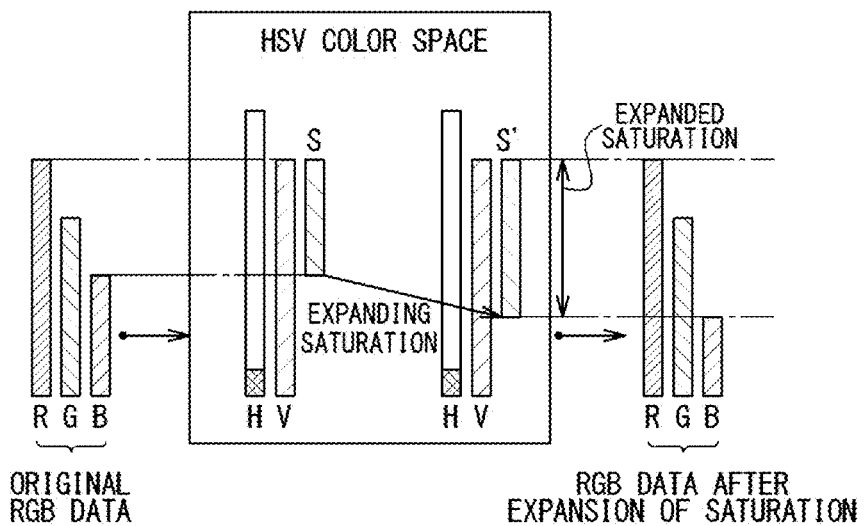
FIG. 3 is a conceptual diagram showing saturation expansion processing in which RGB input data is converted into HSV data, saturation is expanded in the HSV color space, and the HSV data with the saturation expanded is converted into the RGB data again.

The equation (5-4) means that the saturation component S' of the RGB data after saturation expansion is k times of the saturation component S of the original RGB data. Also, this means that the processing that is identical to expansion processing of the saturation component S into the saturation component S' in the HSV color space of FIG. 3 is possible while saving or retaining the brightness.

The equation (5-4) can be expressed from the equation (4-9) as follows:

$$S'=(\alpha+1)S \qquad (5\text{-}5)$$

Therefore, the above-mentioned saturation expansion processing expands the saturation component S of the original RGB data into the saturation component S' of the RGB data after saturation expansion that is $(\alpha+1)$ times of the saturation component S of the original RGB data.

On the other hand, according to the saturation expansion processing (calculation based on the equations (4-13) to (4-15)) of the present embodiment, the brightness is maintained. That is, the brightness Y' that is calculated from the RGB data after saturation expansion is equal to the brightness Y that is calculated from the original RGB data. This can be understood from the following consideration. Like the equation (4-1), the brightness Y' of the RGB data after saturation expansion is calculated from the following equation:

$$Y'=aR'+bG'+cB' \qquad (6\text{-}1)$$

In the present embodiment, substituting the equations (4-1.3) to (4-15) for the equation (6-1), the following equation is obtained:

$$\begin{aligned} Y' &= a\{R+\alpha(R-Y)\}+b\{G+\alpha(G-Y)\}+c\{B+\alpha(B-Y)\} \qquad (6\text{-}2) \\ &= (aR+bG+cB)+\alpha\{aR+bG+cB-(a+b+c)Y\} \end{aligned}$$

Here, the following equation (6-3) holds from the equation (4-1):

$$Y'=Y+\alpha\{Y-(a+b+c)Y\} \qquad (6\text{-}3)$$

Moreover, because the equation (4-2) holds, the following equation holds:

$$Y'=Y \qquad (5\text{-}4)$$

That is, in the saturation expansion processing in the present embodiment, the brightness Y is saved or retained.

The saturation expansion processing through the above calculation may be carried out in hardware or in software. Also, it may be carried out in a combination of hardware and software. However, as could be understood from the equations (4-13) to (4-15), because the saturation expansion processing in the present embodiment is feasible by using the simple equation, it is suitable to implement with only a hardware circuit.

Figure 9:
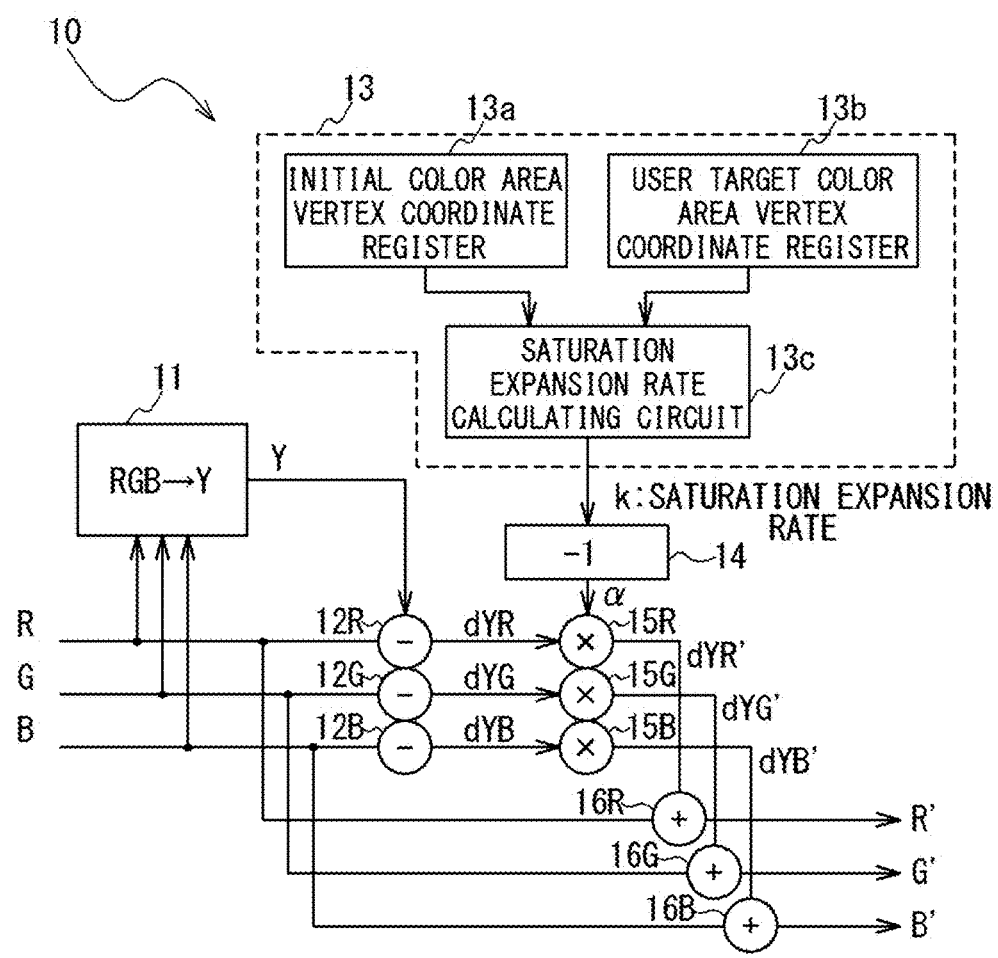
FIG. 9 is a diagram schematically showing an example of the configuration of a saturation expansion circuit in the first embodiment.

FIG. 9 is a block diagram showing a configuration example of a saturation expansion circuit as the hardware circuit that carries out the saturation expansion processing in the first embodiment. The saturation expansion circuit 10 in the present embodiment is configured as an image processing unit that includes a brightness calculating circuit 11, subtractors 12R, 12G and 12B, a saturation expansion rate calculating section 13, a subtractor 14, multipliers 15R, 15G and 15B, and adders 16R, 16G and 16B.

The brightness calculating circuit 11 calculates the brightness Y based on the value R, G, and B of the R data, the G data, and the B data of the original. RGB data. The calculation of the brightness Y is carried out according to the above-mentioned equation (4-1).

The subtractor 12R subtracts the brightness Y from the value R of the R data of the original RGB data to calculate a difference dYR (=R−Y). In the same way, the subtractor 12G subtracts the brightness Y from the value G of the G data of the original RGB data to calculate a difference dYG (=G−Y). Also, the subtractor 12B subtracts the brightness Y from the value B of the B data of the original RGB data to calculate a difference dYB (=B−Y). The subtractors 12R, 12G, and 12B are the hardware circuits that realize the above-mentioned equations (4-3) to (4-5).

The saturation expansion rate calculating section 13 calculates the saturation expansion rate k based on a register value set by the user. In detail, the saturation expansion rate calculating section 13 includes an initial color area vertex coordinate register 13a, a user target color area vertex coordinate register 13b and a saturation expansion rate calculating circuit 13c. The saturation expansion rate calculating circuit 13c calculates the saturation expansion rate k based on a register value held by the initial color area vertex coordinate register 13a and a register value held by the user target color area vertex coordinate register 13b. Here, the value set by the user is permissible as the register value held by the user target color area vertex coordinate register 13b. In other words, the saturation expansion rate calculating circuit 13c has a function of calculating the saturation expansion rate k according to the register value set by the user. The calculation of the saturation expansion rate k by the saturation expansion rate calculating section 13 will be described later in detail.

The subtractor 14 prepares a saturation increase rate by subtracting "1" from the saturation expansion rate k given from the saturation expansion rate calculating section 13 to calculate the coefficient $\alpha$. The saturation expansion rate calculating section 13 and the subtractor 14 function as a coefficient generating section that generates the coefficient $\alpha$ according to the register value set by the user as a whole.

The multiplier 15R multiplies the difference dYR calculated by the subtractor 12R by the coefficient $\alpha$ to calculate the value dYR'. In the same way, the multiplier 15G multiplies the difference dYG calculated by the subtractor 12G by the coefficient $\alpha$ to calculate the value dYG'. Moreover, the multiplier 15B multiplies the difference dYB calculated by the subtractor 12B by the coefficient $\alpha$ to calculate the value dYB'. The multipliers 15R, 15G, and 15B are the hardware circuits which realize the above-mentioned equations (4-6) to (4-8).

The adder 16R adds the value R of the R data of the original RGB data and the value dYR' calculated by the multiplier 15R to calculate the value R' of the R data of the RGB data after saturation expansion. In the same way, the adder 16G adds the value G of the G data of the original RGB data and the value dYG' calculated by the multiplier 15G to calculate the value G' of the G data of the RGB data after saturation expansion. Moreover, the adder 16B adds the value B of the B data of the original RGB data and the value dYB' calculated by the multiplier 15B to calculate the value B' of the B data of the RGB data after saturation expansion.

In this case, note that the subtractor 12R, the multiplier 15R, and the adder 16R function as an operation processing section (first operation processing section) of calculating the value R' of the R data of the RGB data after saturation expansion from the value R of the R data of the original RGB data by using the coefficient $\alpha$ given from the subtractor 14. In the same way, the subtractor 12G, the multiplier 15G, and the adder 16G function as an operation processing section (second operation processing section) of calculating the value G' of the G data of the RGB data after saturation expansion from the value G of the G data of the original RGB data by using the coefficient $\alpha$ given from the subtractor 14. Also, the subtractor 12B, the multiplier 15B, and the adder 16B function as an operation processing section (third operation processing section) of calculating the value B' of the B data of the RGB data after saturation expansion from the value B of the B data of the original RGB data by using the coefficient α given from the subtractor 14.

It could be easily understood that the saturation expansion circuit 10 having such a configuration carries out the saturation expansion processing according to the equations (4-13) to (4-15)

Figure 10:
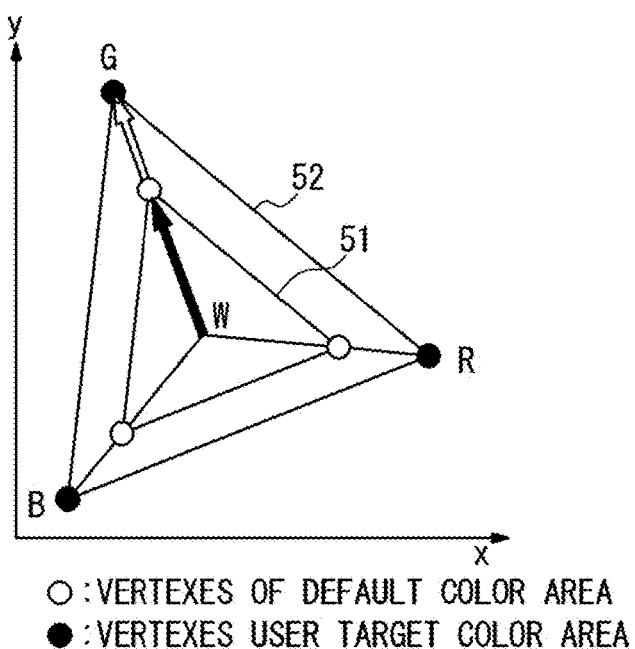
FIG. 10 is a conceptual diagram showing a vertex of a default color area and a vertex of a user target color area.

Next, the calculation of the saturation expansion rate k by the saturation expansion rate calculating section 13 will be described. As mentioned above, the saturation expansion rate calculating section 13 includes the initial color area vertex coordinate register 13*a*, the user target color area vertex coordinate register 13B, and the saturation expansion rate calculating circuit 13*c*. The initial color area vertex coordinate register 13*a* stores the register value indicating coordinate points of the vertexes of a default color area (for example, an original color area of a display image on a display unit in which the saturation expansion circuit 10 is incorporated). As shown in FIG. 10, the default color area is shown by a triangle 51 that has a vertex corresponding to each of the 3 primary colors (red, green, blue) and the coordinate point of each vertex is expressed as a chromaticity coordinate point (x, y).

On the other hand, the user target color area vertex coordinate register 13*b* stores the register value indicating a coordinate point of each of vertexes of a color area where the user hopes to realize (user target color area). Here, the user target color area is a color area where the user hopes to realize in a display image on the display unit in which the saturation expansion circuit 10 is incorporated. The user target color area is shown by a triangle 52 that has a vertex corresponding to each of the 3 primary colors and the coordinate point of each vertex is expressed as a chromaticity coordinate point (x,y).

The saturation expansion rate calculating circuit 13*c* calculates the saturation expansion rate k according to the following equation (7):

$$k = \sqrt{\frac{S_{USER}}{S_{DEFAULT}}} \quad (7)$$

where $S_{DEFAULT}$ is an area of the default color area and $S_{USER}$ is an area of the user target color area. The calculated saturation expansion rate k is supplied to the subtractor 14 and is used to calculate the coefficient α to be multiplied by the differences dYR, dYG, and dYB. Note that it is possible to set the previously calculated saturation expansion rate k directly as the register value and to calculate the saturation expansion rate k as a function having variables of the hue component H, the saturation component S, and the value component V of each pixel.

Figure 11:
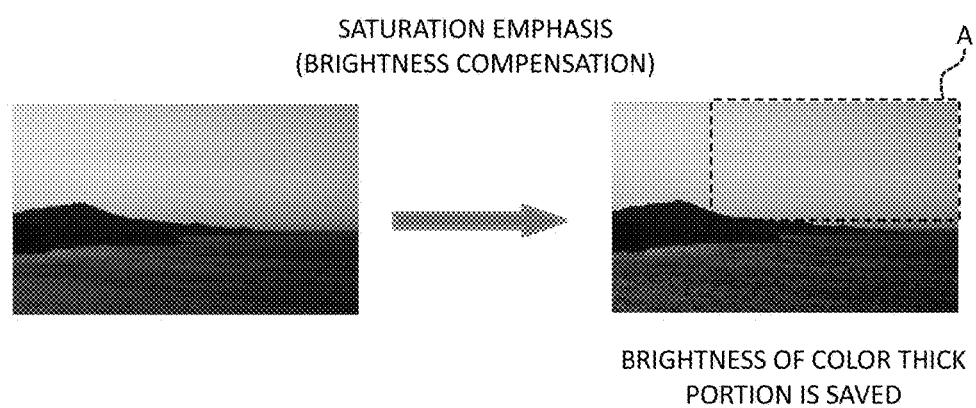
FIG. 11 is a diagram showing an example of an image obtained through the saturation expansion processing in the first embodiment.

As described above, according to the saturation expansion processing and the saturation expansion circuit in the present embodiment, the saturation can be expanded while retaining the brightness Y. FIG. 11 is a diagram showing an example of the result of the image through the saturation expansion processing in the present embodiment. As shown in FIG. 5, in the saturation expansion processing while saving the value component V, the brightness of each pixel declines and the image becomes dark. On the other hand, as shown in FIG. 11, in the saturation expansion processing in the present embodiment, the brightness of each pixel is maintained and the problem can be effectively solved that the image becomes dark.

[Second Embodiment]

In a second embodiment, the saturation expansion processing is carried out to expand the saturation component S while saving the reference value C. However, in the second embodiment, the reference value C is calculated as a weighted average of the value component V and the brightness Y. That is, in the second embodiment, the saturation expansion processing is carried out like the first embodiment while using the reference value C that is calculated as the weighted average of value component V and the brightness component Y instead of the brightness component Y.

In this case, the value component V is the maximum value of the R data, the G data, the B data of the RGB data (reference to equation (1-1)), and the brightness Y is calculated as the weighted average of the R data, the G data, the B data. Therefore, note that even in case that the reference value C is calculated as the weighted average of the value component V and the brightness Y, the reference value C is the weighted average of the R data, the G data, the B data. Hereinafter, the saturation expansion processing in the second embodiment will be described in detail.

First, the brightness Y is calculated as the weighted average of the values of the R data, the G data, and the B data of the original RGB data according to the following equation:

$$Y = aR + bG + cB \quad (8\text{-}1)$$

Here, R, G, and B are the values of the R data, the G data, and the B data of the original RGB data respectively. Also, a, b, and c are respectively the weighting coefficients given to the R data, the G data, and the B data, and the following equation holds:

$$a + b + c = 1 \quad (8\text{-}2)$$

Moreover, the value component V is calculated according to the following equation:

$$V = \max(R, G, B) \quad (8\text{-}3)$$

Here, max(R,G,B) is a function showing a maximum value of R, G, and B.

Moreover, the reference value C is calculated as the weighted average of value component V and the brightness Y according to the following equation:

$$C = \beta Y + (1-\beta)V \quad (8\text{-}4)$$

Here, β is a weighting coefficient and is greater than or equal to "0" and smaller than or equal to "1". The equation (8-4) means that the weighting coefficient given to the brightness Y is β and that the weighting coefficient given to the value component V is (1−β). The reference value C is calculated as the weighted average, of the value component V and the brightness Y, which is calculated by giving the weighting coefficient β to one of the value component V and the brightness Y and the weighting coefficient (1−β) to the other.

Note that it is possible to make the reference value C equal to the brightness Y in the equation (8-4) by setting β to be "1". In this case, the processing that is identical to the saturation expansion processing in the first embodiment is carried out. Also, it is possible to make the reference value C equal to the value component V by setting β=0. In this case, the saturation expansion processing is carried out while saving the value component V.

Moreover, the difference dCR between the R data and the reference value C, the difference dCG between the data G and the reference value C, the difference dCB between the data B and the reference value C are calculated. The differ ences dCR, dCG, and dCB are given from the following equations (8-5) to (8-7):

$$dCR = R - C \quad (8\text{-}5)$$

$$dCG = G - C \quad (8\text{-}6)$$

$$dCB = B - C \quad (8\text{-}7)$$

Moreover, the values dCR', dCG', dCB' are calculated by multiplying the differences dCR, dCG, and dCB by the coefficient α. The values dCR', dCG', and dCB' are given from the following equations (8-8) to (8-10):

$$dCR' = \alpha \cdot dCR \quad (8\text{-}8)$$

$$dCG' = \alpha \cdot dCG \quad (8\text{-}9)$$

$$dCB' = \alpha \cdot dCB \quad (8\text{-}10)$$

As mentioned above, the coefficient α is a value dependent on the desired saturation expansion rate k, and more specifically, is a value obtained by subtracting "1" from the saturation expansion rate k. That is, $$\alpha = k - 1 \quad (8\text{-}11)$$

Because k is generally greater than "1", α is a positive number.

The values R', G', and B' of the R data, the G data, and the B data of the RGB data after saturation expansion are respectively calculated by adding the compensation values dCR', dCG' and dCB to the values R, G, and B of the R data, the G data, and the B data of the original RGB data. That is, $$R' = R + dCR' \quad (8\text{-}12)$$

$$G' = G + dCG' \quad (8\text{-}13)$$

$$B' = G + dCB' \quad (8\text{-}14)$$

Summarizing the above calculations, in the present embodiment, the value R', G', and B' of the R data, the G data, and the B data of the RGB data after saturation expansion are calculated according to the following equations:

$$R' = R + \alpha(R - C) \quad (8\text{-}15)$$

$$G' = G + \alpha(G - C) \quad (8\text{-}16)$$

$$B' = B + \alpha(B - C) \quad (8\text{-}17)$$

In the saturation expansion processing of the present embodiment, the value R', G', and B' of the R data, the G data, and the B data of the RGB data after saturation expansion are calculated according to the equations (8-15) to (8-17). Here, the phrase of "according to the equations (8-1.5) to (8-17)" means an operation using equations that are equivalent to the equations (8-15) to (8-1.7) in addition to an operation using the equations (4-13) to (4-15).

In this case, note that the equations (8-15) to (8-17) are the same as the equations in which Y is replaced with C in the equations (4-13) to (4-15) of the first embodiment. Accordingly, in the second embodiment, it could be understood to a person skilled in the art that the saturation component S' of the RGB data after saturation expansion is k times of the saturation component S of the original RGB data and that the reference value C is saved or retained in the saturation expansion processing.

Figure 12:
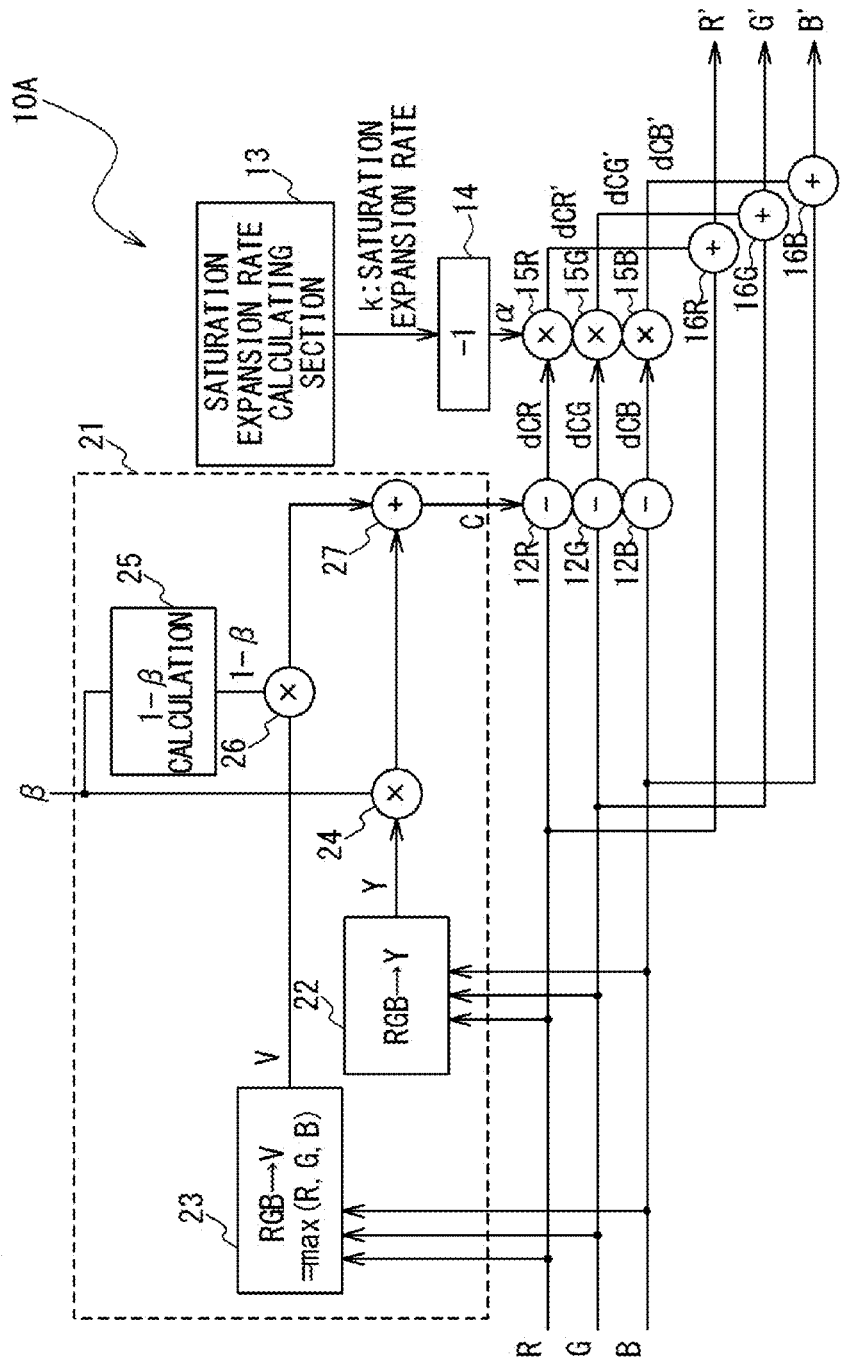
FIG. 12 is a diagram schematically showing an example of the configuration of the saturation expansion circuit in a second embodiment.

FIG. 12 is a block diagram showing an example of the configuration of the saturation expansion circuit 10A that is a hardware circuit for carrying out the saturation expansion processing in the second embodiment. The saturation expansion circuit 10A in the second embodiment has the same configuration as that of the saturation expansion circuit 10 in the first embodiment, excluding that the reference value calculating circuit 21 is provided instead of the brightness calculating circuit 11.

The reference value calculating circuit 21 calculates the reference value C as the weighted average of the value component V and the brightness Y from the values R, G, and B of the R data, the G data, and the B data of the original RGB data. In detail, the reference value calculating circuit 21 includes a brightness calculating circuit 22, a value calculating circuit 23, a multiplier 24, a subtractor 25, a multiplier 26 and an adder 27. The brightness calculating circuit 22 calculates the brightness Y based on the values B, G, and B of the R data, the G data, and the B data of the original RGB data. The calculation of the brightness Y is carried out according to the above-mentioned equation (8-1). The value calculating circuit 23 calculates the value component V based on the values R, G, and B of the R data, the G data, and the B data of the original RGB data. As could be understood from the above-mentioned equation (8-3), the value component V is calculated as the maximum value of the values R, G, and B. The multiplier 24 calculates a product of the weighting coefficient β and the brightness Y. The subtractor 25 calculates the difference 1−β obtained by subtracting the weighting coefficient β from "1". The multiplier 26 calculates a product: of the value component V and (1−β). The adder 27 adds the outputs of the multipliers 24 and 26. According to the reference value calculating circuit 21 of such a configuration, the reference value C is calculated according to the equation (8-4).

Note that in the calculation of the reference value C, the weighting coefficient β may be given to the value component V and the weighting coefficient (1−β) may be given to the brightness Y. In this case, the weighting coefficient (1−β) is supplied (that is, the output value of the subtractor 25 is supplied) to the multiplier 26 and the weighting coefficient β is supplied to the multiplier 26.

The subtractor 12R subtracts the reference value C from the value R of the R data of the original RGB data to calculate the difference dCR (=R−C). In the same way, the subtractor 12G subtracts the reference value C from the value G of the G data of the original RGB data to calculate the difference dCG (=G−C), and the subtractor 12B subtracts the reference value C from the value B of the B data of the original RGB data to calculate the difference dCB (=B−C). The subtractors 12R, 12G, and 12B are the hardware circuits which realize the calculations of the above-mentioned equations (8-5) to (8-7).

The saturation expansion rate calculating section 13 calculates the saturation expansion rate k based on the register value set by the user. Although not shown in FIG. 12, the configuration and operation of the saturation expansion rate calculating section 13 in the second embodiment may be identical to those of the saturation expansion rate calculating section 13 in the first embodiment (reference FIG. 9).

The subtractor 14 subtracts "1" from the saturation expansion rate k given from the saturation expansion rate calculating section 13 to calculate the coefficient α. The saturation expansion rate calculating section 13 and the subtractor 14 function as the coefficient generating section which generates the coefficient α according to the register value set by the user as a whole.

The multiplier 15R multiplies the difference dCR calculated by the subtractor 12R by the coefficient α to calculate the value dCR'. In the same way, the multiplier 15G multiplies the difference dCG calculated by the subtractor 12G by the coefficient α to calculate the value dCG'. Moreover, the multiplier 15B multiplies the difference dCB calculated by the subtractor 12B by the coefficient α to calculate the value dCB'. The multipliers 15R, 15G, and 15B are hardware circuits that realize the calculations of the above-mentioned equations (8-8) to (8-10).

The adder 16R adds the value R of the R data of the original RGB data and the value dCR' calculated by the multiplier 15R to calculate the value R' of the R data of the RGB data after saturation expansion. In the same way, the adder 16G adds the value G of the G data of the original RGB data and the value dCG' calculated by the multiplier 15G to calculate the value G' of the G data of the RGB data after saturation expansion. Moreover, the adder 16B adds the value B of the B data of the original RGB data and the value dCB' calculated by multiplier 15B to calculate the value B' of the B data of the RGB data after saturation expansion.

It could be easily understood that the saturation expansion circuits 10A of such a configuration carries out the saturation expansion processing according to the equations (8-15) to (8-17).

One advantage of the saturation expansion circuits 10A of FIG. 12 is in that by the setting of the value β, the saturation expansion processing while saving the value component V, the saturation expansion processing while saving the brightness Y and the saturation expansion processing in which they are mixed can be freely realized. When setting β=1, the reference value C coincides with the brightness Y. In this case, the processing that is identical to the saturation expansion processing in the first embodiment is carried out. Also, when setting β=0, the reference value C coincides with the value component V. In this case, the saturation expansion processing while saving the value component V is carried out.

As described above, according to the saturation expansion processing and the saturation expansion circuit in the second embodiment, the saturation can be expanded while retaining the reference value C. Here, the reference value C is calculated as the weighted average of the brightness Y and the value component V. Also, in the present embodiment, by appropriately setting the weighting coefficient β that is used for the calculation of the weighted average of the brightness Y and the value component V, the saturation expansion processing while saving the value component V, the saturation expansion processing while saving the brightness Y, and the saturation expansion processing in which they are mixed can be freely realized.

[Third Embodiment]

Figure 13:
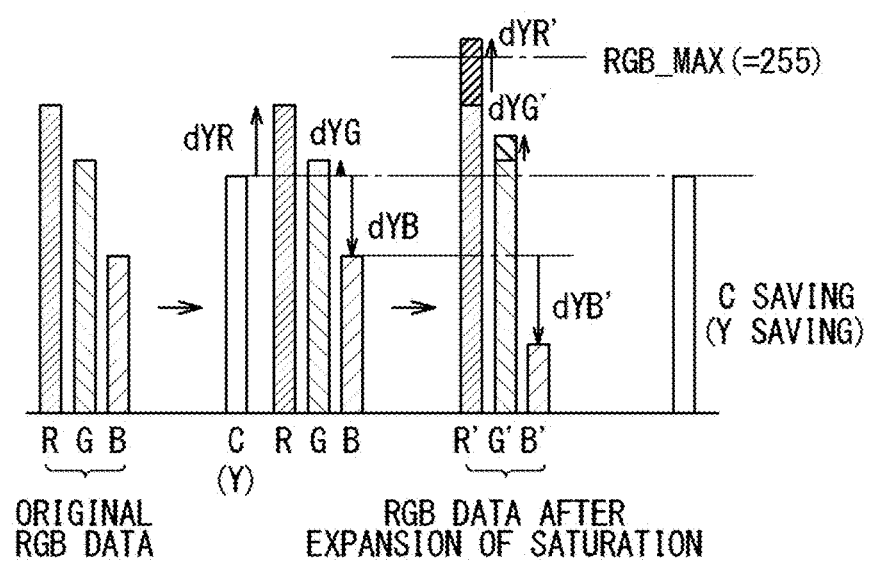
FIG. 13 is a diagram showing the occurrence of overflow of sub pixel data in the saturation expansion processing in the first and second embodiments.
Figure 14:
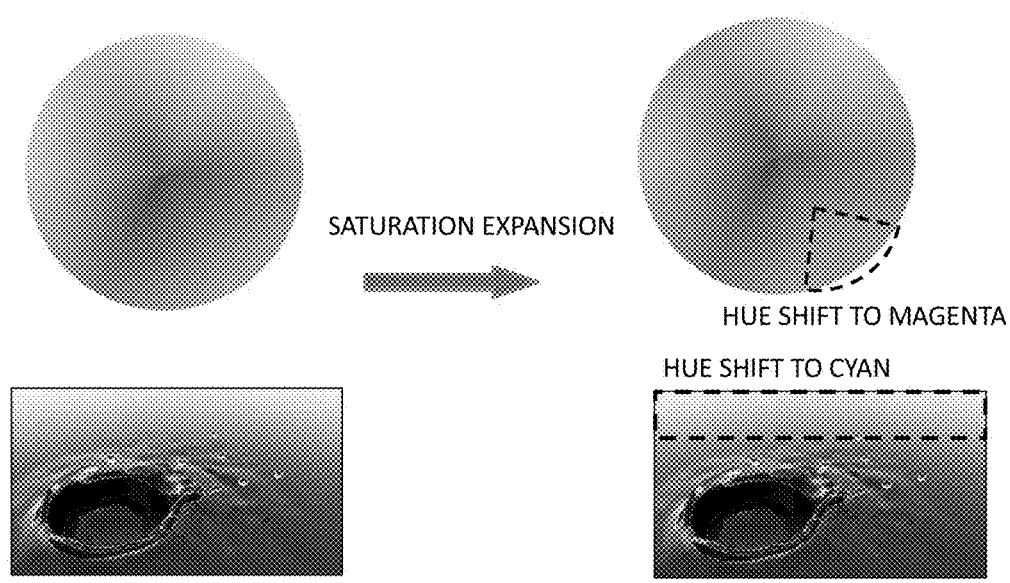
FIG. 14 is a diagram showing an example of hue deviation due to the occurrence of an underflow condition or an overflow condition of the sub pixel data that accompanies the saturation expansion processing.
Figure 15:
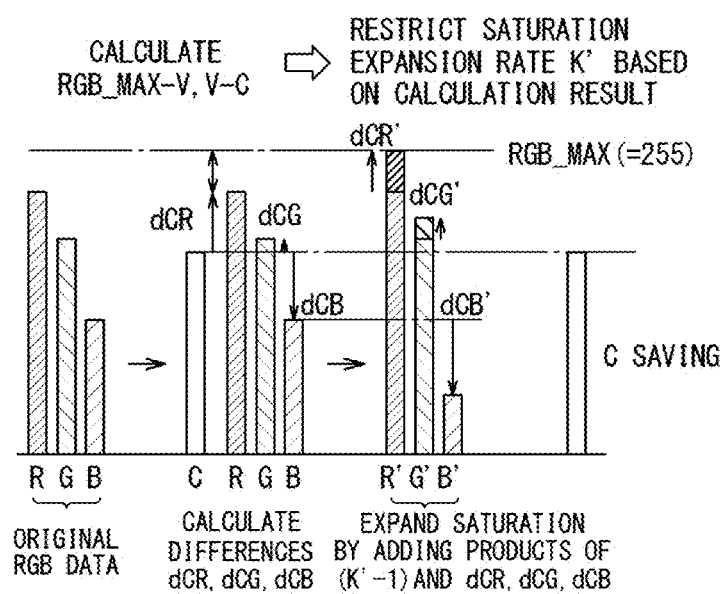
FIG. 15 is a diagram showing the prevention of occurrence of overflow in a third embodiment.

FIG. 13 to FIG. 15 are diagrams to describe the technical features of the saturation expansion processing in a third embodiment. In the saturation expansion processing in the first and second embodiments, the values of the R data, the G data, the B data of the RGB data after saturation expansion sometimes become smaller than a lower limit value RGB_MIN or become greater than an upper limit value RGB_MAX. Here, the lower limit value RGB_MIN is "0" generally and the upper limit value RGB_MAX is a value that is determined according to the bit width of the R data, the G data, and the B data. In case that each of the R data, the G data, and the B data is n-bit data, the lower limit value RGB_MIN is "0" and the upper limit value RGB_MAX is $2^n-1$.

Referring to FIG. 13, for example, consider a case that each of the values of the R data, the G data, and the B data is expressed in 8 bits. In this case, each of the R data, the G data, and the B data of the RGB data is given as a value in a range of "00000000" (=0) to "11111111" (=255). In this case, when the value of the R data, the G data or the B data of the original RGB data is a value which is near the lower limit value RGB_MIN (=0) or is a value that is near the upper limit value RGB_MAX (=255), a value obtained from the equations (4-13) to (4-15) or (8-15) to (8-17) sometimes is smaller than the lower limit value RGB_MIN (i.e. underflow condition) or is greater than the upper limit value RGB_MAX (i.e. overflow condition). FIG. 13 shows a case where the value R of the R data of the original RGB data is near the upper limit value RGB_MAX and the value R' of the R data of the RGB data after expansion processing exceeds the upper limit value RGB_MAX.

One measure when an underflow or an overflow condition occurs is to cut (clip) the calculation result of the saturation expansion processing to the lower limit value RGB_MIN or the upper limit value RGB_MAX. However, in such a measure, the hue component H that is shown based on a ratio of the differences of the R data, the G data, and the B data is not saved and the hue shift is caused. In addition, the brightness Y or the reference value C is not saved. FIG. 14 is a diagram showing an example of a hue shift through the generation of an underflow condition or an overflow condition.

To cope with such a problem, in the third embodiment, the saturation expansion rate is limited to a value below a specific upper limit value and thus, underflow or overflow conditions are prevented. In the following description, the saturation expansion rate that is determined by using the user setting (i.e. the saturation expansion rate according to the hope of the user) is expressed as k, and the saturation expansion rate actually used for the saturation expansion processing (i.e. limited saturation expansion rate) is expressed as k'.

As shown in FIG. 15, in order to prevent the generation of the overflow condition, a difference RGB_MAX−V obtained by subtracting the value component V (that is, the maximum value of the R data, the G data, and the B data of the original RGB data) from the upper limit value RGB_MAX, and a difference V−C obtained by subtracting the reference value C from the value component V are calculated, and the saturation expansion rate is limited based on the differences RGB_MAX−V and V−C.

More specifically, in order to prevent the generation of the overflow condition, it is sufficient to limit the saturation expansion rate k' actually used, to a value below a first upper limit value $k_{MAX\_OVER}$ which is determined according to the following equation (9-1):

$$k_{MAX\_OVER} = 1 + \frac{RGB\_MAX - V}{V - C} \quad (9\text{-}1)$$

where when the brightness Y is used as the reference value C, the first upper limit value $k_{MAX\_OVER}$ is calculated based on the following equation (9-2):

$$k_{MAX\_OVER} = 1 + \frac{RGB\_MAX - V}{V - Y} \quad (9\text{-}2)$$

On the other hand, in order to prevent the generation of the underflow condition, it is sufficient to limit the saturation expansion rate k' actually used, to a value below a second upper limit value $k_{MAX\_UPPER}$ that is determined based on the following equation (9-3):

$$k_{MAX\_UNDER} = 1 + \frac{MIN}{C - MIN} \quad (9\text{-}3)$$

In the equation (9-3), MIN is a minimum value of x, y, and z. Here, when the brightness Y is used as the reference value C, the second upper limit value $k_{MAX\_UNDER}$ is calculated from the following equation (9-4):

$$k_{MAX\_UNDER} = 1 + \frac{MIN}{Y - MIN} \quad (9\text{-}4)$$

In order to restrain both of the overflow and the underflow conditions, it is sufficient to calculate the saturation expansion rate k' that is actually used for the saturation expansion processing from the following equation (9-5):

$$k' = \min(k, k_{MAX\_OVER}, k_{MAX\_UNDER}) \quad (9\text{-}5)$$

Also, in order to restrain only the generation of the overflow condition, it is sufficient to calculate the saturation expansion rate k' that is actually used for the saturation expansion processing from the following equation (9-6)

$$k' = \min(k, k_{MAX\_OVER}) \quad (9\text{-}6)$$

Regarding the underflow condition, even if the calculation result obtained in the saturation expansion processing is not cut below the lower limit value RGB_MIN, the influence to the hue component H is small. Accordingly, even if the saturation expansion rate k' that is actually used for the saturation expansion processing is limited to prevent only the generation of the overflow condition, it is sufficient for practical use.

Figure 16:
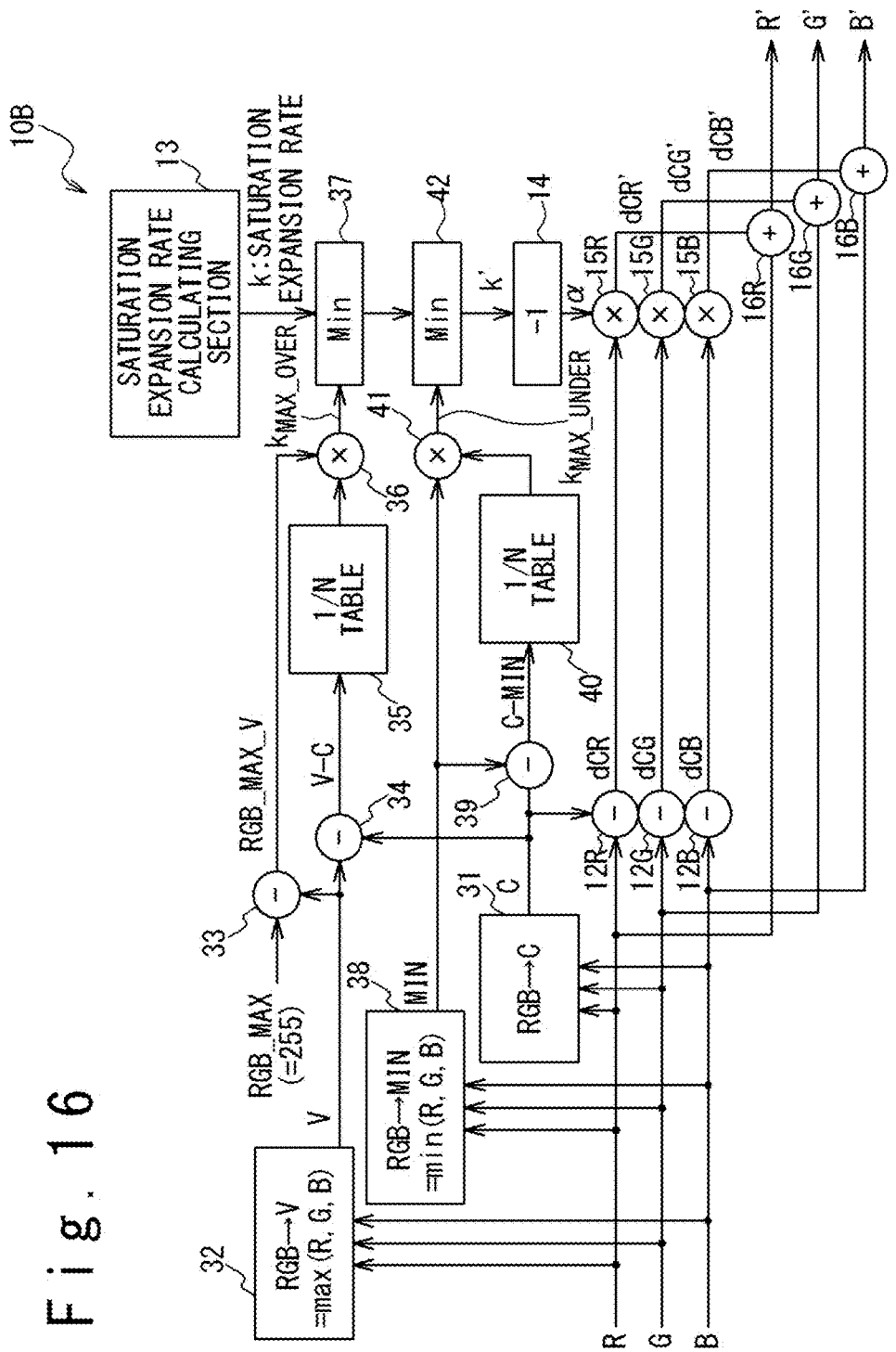
FIG. 16 is a diagram schematically showing an example of the configuration of the saturation expansion circuit in the third embodiment.

FIG. 16 is a block diagram showing an example of the configuration of the saturation expansion circuit as a hardware circuit that carries out the saturation expansion processing in the third embodiment. The saturation expansion circuit 10B shown in FIG. 16 has the configuration similar to the saturation expansion circuits 10A in the second embodiment, but is configured to restrain both of the overflow and the underflow conditions. More specifically, the saturation expansion circuit 10B includes a reference value calculating circuit 31, a value calculating circuit 32, subtractors 33 and 34, a 1/N table 35, a multiplier 36, a minimum value selecting circuit 37, a minimum value calculating circuit 38, a subtractor 39, a 1/N table 40, a multiplier 41, and a minimum value selecting circuit 42.

The reference value calculating circuit 31 calculates the reference value C based on the values R, G, and B of the R data, the G data, and the B data of the original RGB data. The reference value calculating circuit 31 calculates the reference value C as the weighted average of the value component V and the brightness Y like the reference value calculating circuit 21 in the second embodiment. Instead of it, the reference value calculating circuit 31 may calculate the brightness Y as the reference value C.

The value calculating circuit 32, the subtractors 33 and 34, the 1/N table 35 and the multiplier 36 configure a first upper limit value calculating section that calculates the first upper limit value $k_{MAX\_OVER}$. The value calculating circuit 32 calculates the value component V, i.e. the maximum value of the values R, G, and B of the R data, the G data, and the B data of the original RGB data. The subtractor 33 calculates the difference RGB_MAX−V obtained by subtracting the value component V from the upper limit value RGB_MAX and the subtractor 34 calculates the difference V−C obtained by subtracting the reference value C from the value component V. The 1/N table 35 is a lookup table in which the input value and the output value are related to each other such that the output value is related to a reciprocal of the input value, and outputs the reciprocal of the input value as the output value. Because the difference V−C is supplied to the 1/N table 35 from the subtractor 34, the 1/N table 35 outputs the reciprocal 1/(V−C) as the output value. The multiplier 36 calculates a product of the output value from the 1/N table 35 and the difference RGB_MAX−V outputted from the subtractor 33. The output value of the multiplier 36 is the first upper limit value $k_{MAX\_OVER}$ that is calculated according to the equation (9-1).

The minimum value calculating circuit 38, the subtractor 39, the 1/N table 40, the multiplier 41 and the minimum value selecting circuit 42 configure a second upper limit value calculating section that calculates the second upper limit value $k_{MAX\_UNDER}$. The minimum value calculating circuit 38 calculates the minimum value MIN of the values R, G, and B of the R data, the G data, and the B data of the original RGB data. The subtractor 39 calculates the difference C−MIN obtained by subtracting the minimum value MIN from the reference value C. The 1/N table 40 is a lookup table in which the input value and the output value are related to each other such that the output value is related to a reciprocal of the input value, and outputs the reciprocal of the input value as the output value. Because the difference C−MIN is supplied to the 1/N table 40 from the subtractor 39, the 1/N table 40 outputs the reciprocal 1/(C−MIN) as the output value. The multiplier 41 calculates a product of the output value from the 1/N table 40 and the minimum value MIN outputted from minimum value calculating circuit 38. The output value of the multiplier 41 is the second upper limit value $k_{MAX\_UNDER}$ that is calculated according to the equation (9-3).

The minimum value selecting circuit 37 outputs a smaller one of the saturation expansion rate k output from the saturation expansion rate calculating section 13 and the first upper limit value $k_{MAX\_OVER}$ output from the multiplier 36 as the output value. Here, the saturation expansion rate calculating section 13 calculates the saturation expansion rate k based on the register value set by the user, like the first and second embodiments. Although not shown in FIG. 16, the configuration and operation of the saturation expansion rate calculating section 13 in the second embodiment may be identical to those of the saturation expansion rate calculating section 13 in the first embodiment (reference to FIG. 9).

Also, the minimum value selecting circuit 42 outputs a smaller one of the output value provided by the minimum value selecting circuit 37 and the second upper limit value $k_{MAX\_UNDER}$ provided by the multiplier 41 as the saturation expansion rate k', which is actually used for the saturation expansion processing. That is, the minimum value selecting circuits 37 and 42 as a whole function as a selecting section to select a smaller one of the saturation expansion rate k, the first upper limit value $k_{MAX\_OVER}$, and the second upper limit value $k_{MAX\_UNDER}$ as the saturation expansion rate k' actually used for the saturation expansion processing. Thus, the saturation expansion rate k' is limited to a value that is smaller than the first upper limit value $k_{MAX\_OVER}$ and the second upper limit value $k_{MAX\_UNDER}$. The saturation expansion rate k' is supplied to the subtractor 14 and is used for the calculation of the coefficient α. In the present embodiment, the subtractor 14 calculates the coefficient α as the value obtained by subtracting "1" from the saturation expansion rate k'. That is, $$\alpha = k' - 1 \quad (9\text{-}7)$$

The values R', G', and B' of the R data, the G data, and the B data of the RGB data after saturation expansion are calculated by using the coefficient α that is output from the subtractor 14. In detail, the subtractor 12R subtracts the reference value C from the value R of the R data of the original RGB data to calculate the difference dCR (=R−C). In the same way, the subtractor 12G subtracts the reference value C from the value G of the G data of the original RGB data to calculate the difference dCG (=G−C). The subtractor 12B subtracts the reference value C from the value B of the B data of the original RGB data to calculate the difference dCB (=B−C). The subtractors 12R, 12G, and 12B are hardware circuits that realize the calculations of the above-mentioned equations (8-5) to (8-7).

Also, the multiplier 15R multiplies the difference dCR calculated by the subtractor 12R by the coefficient α to calculate the value dCR'. In the same way, the multiplier 15G multiplies the difference dCG calculated by the subtractor 12G by the coefficient α to calculate the value dCG'. Moreover, the multiplier 15B multiplies the difference dCB calculated by subtractor 12B by the coefficient α to calculate the value dCB'. The multipliers 15R, 15G, and 15B are hardware circuits that realize the calculations of the above-mentioned equations (8-8) to (8-10).

Moreover, the adder 16R adds the value R of the R data of the original RGB data and the value dCR' calculated by the multiplier 15R to calculate the value R' of the R data of the RGB data after saturation expansion. In the same way, the adder 16G adds the value G of the G data of the original RGB data and the value dCG' calculated by the multiplier 15G to calculate the value G' of the G data of the RGB data after saturation expansion. Moreover, the adder 16B adds the value B of the B data of the original RGB data and the value dCB' calculated by the multiplier 15B to calculate the value B' of the B data of the RGB data after saturation expansion. According to such calculations, it is as mentioned above that the reference value C is saved or retained in the saturation expansion processing.

In the saturation expansion circuit 10B of the configuration of FIG. 16, the saturation expansion rate k' that is actually used for the saturation expansion processing is limited to a value that is smaller than the first upper limit value $k_{MAX\_OVER}$ calculated according to the equation (9-1) and the second upper limit value $k_{MAX\_UNDER}$ calculated according to the equation (9-3). Therefore, according to the saturation expansion processing by the saturation expansion circuit 10B having the configuration of FIG. 16, the generation of the overflow and the underflow can be restrained.

Figure 17:
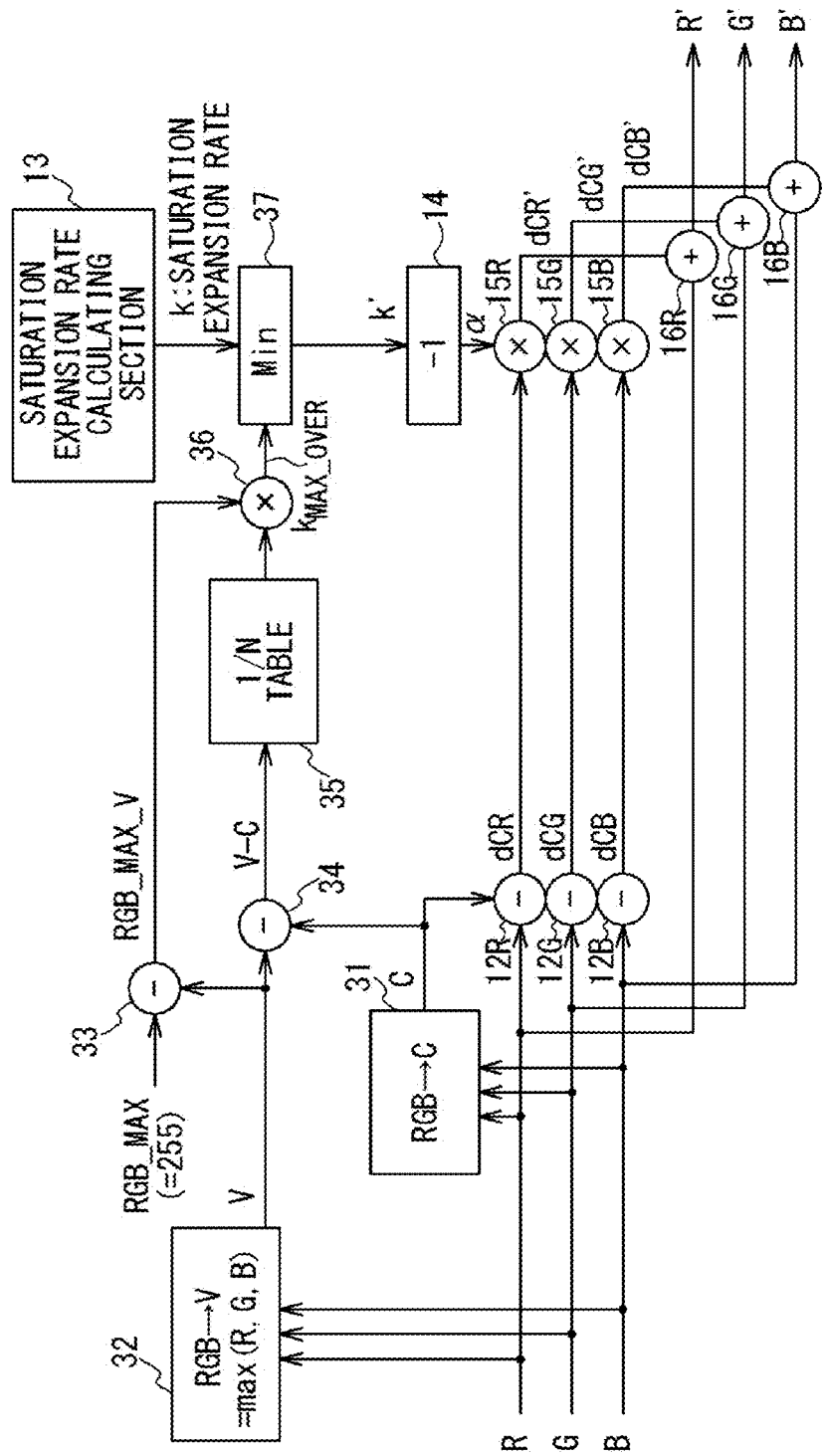
FIG. 17 is a circuit diagram schematically showing another example of the configuration of the saturation expansion circuit in the third embodiment.

FIG. 17 shows another example of the configuration of the saturation expansion circuit that carries out the saturation expansion processing in the third embodiment. Each of the saturation expansion circuits 10C shown in FIG. 17 has the configuration that is similar to the saturation expansion circuit 10B shown in FIG. 16, but is configured to restrain only the generation of the overflow condition (the generation of the underflow condition is not restrained). More specifically, the saturation expansion circuit 10C shown in FIG. 17 has a configuration in which the minimum value calculating circuit 38, the subtractor 39, the 1/N table 40, the multiplier 41 and minimum value selecting circuit 42 are removed from the saturation expansion circuit 10B shown in FIG. 16. As described above, because the minimum value calculating circuit 38, the subtractor 39, the 1/N table 40 and the multiplier 41 configure an operation processing section that calculates the second upper limit value $k_{MAX\_UNDER}$, the saturation expansion circuit 10C shown in FIG. 17 does not have a function of calculating the second upper limit value $k_{MAX\_UNDER}$.

In the saturation expansion circuit. 10C of FIG. 17, the minimum value selecting circuit 37 selects a smaller one of the saturation expansion rate k output from the saturation expansion rate calculating section 13 and the first upper limit value $k_{MAX\_OVER}$ on output from the multiplier 36 as the saturation expansion rate k', which is actually used for the saturation expansion processing. The subtractor 14 calculates the coefficient α as the value obtained by subtracting "1" from the saturation expansion rate k'. Like the saturation expansion circuit 10B of FIG. 16, in the saturation expansion circuit 10C of FIG. 17, the values R', G', and B' of the R data, the G data, and the B data of the RGB data after saturation expansion are calculated by using the coefficient α that is outputted from the subtractor 14.

As described above, according to the saturation expansion processing and the saturation expansion circuit in the third embodiment, the generation of the overflow condition and/or the underflow condition in the saturation expansion processing can be restrained.

(Implementing of the Saturation Expansion Circuit)

Figure 18:
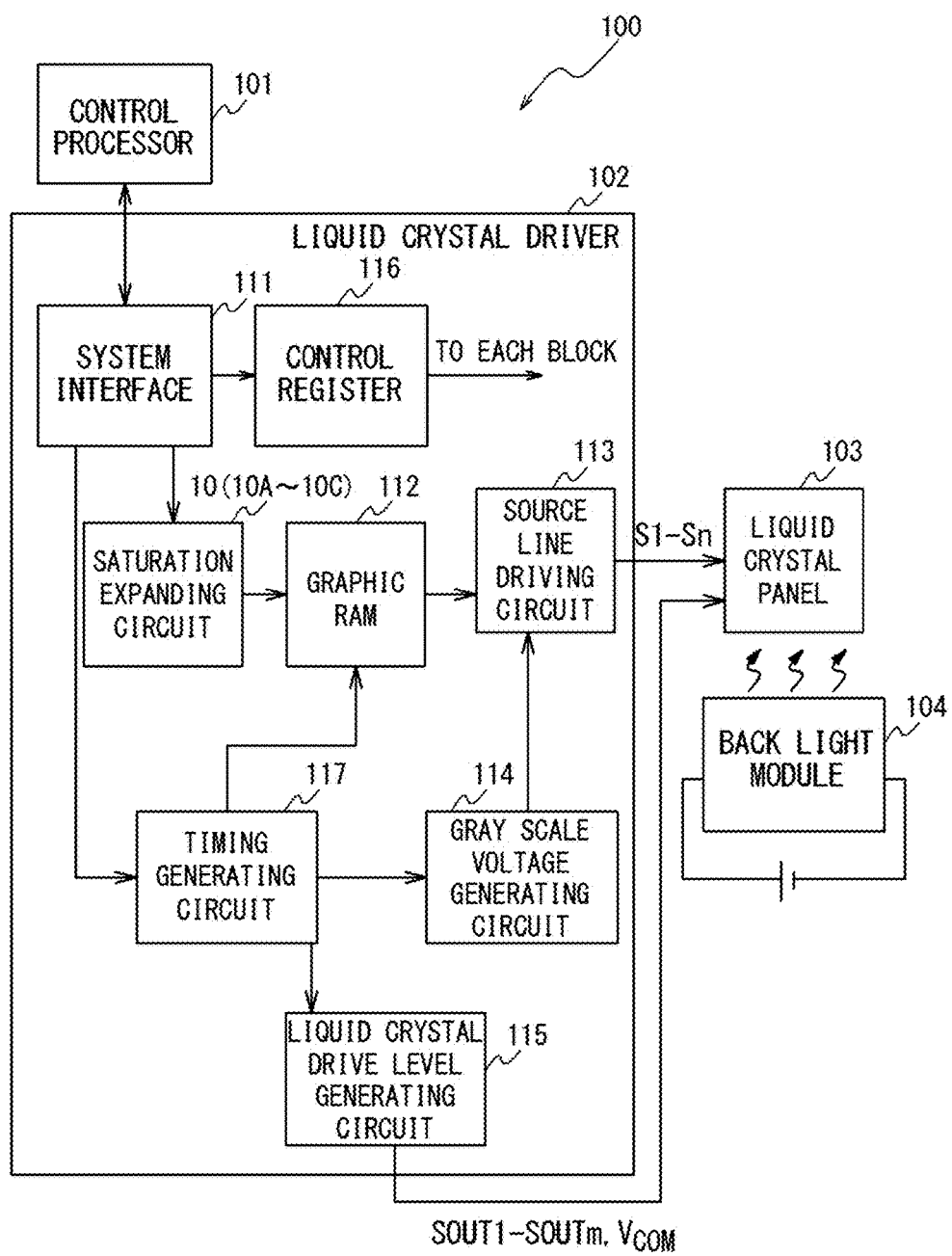
FIG. 18 is a block diagram showing an example of the configuration of a liquid crystal display apparatus that contains a liquid crystal panel driver having the saturation expansion circuit according to the embodiments of the present invention.

Next, a specific example of the implementing of the saturation expansion circuit in the above-mentioned embodiments will be described. The saturation expansion circuit (10, 10A to 10C) in the above-mentioned embodiments may be integrated on a liquid crystal panel driver that drives a liquid crystal panel in a liquid crystal display apparatus. The saturation expansion circuit (10, 10A to 10C) in the above-mentioned embodiments can carry out the saturation expansion processing with the simple configuration, and such a feature is effective especially when being used for the liquid crystal panel driver. FIG. 18 is a diagram showing an example of the configuration of the liquid crystal display apparatus 100 that contains the liquid crystal panel driver that has the saturation expansion circuit in the above-mentioned embodiments.

The liquid crystal display apparatus 100 of FIG. 18 includes a control processor 101, a liquid crystal panel driver 102, a liquid crystal display panel 103 and a backlight module 104. The control processor 101 generates image data corresponding to an image to be displayed on the liquid crystal display panel 103 and control data for controlling the liquid crystal panel driver 102 and transfers them to the liquid crystal panel driver 102. The image data is generated in the RGB form. For example, as the control processor 101, a CPU (central processing unit) can be used.

The liquid crystal panel driver 102 drives source lines (to be also referred to as data lines or signal lines) and gate lines (to be also referred to as digit lines or scanning lines) of the liquid crystal display panel 103 in response to the image data and the control data received from the control processor 101. Note that when a GIP (gate in panel) circuit is incorporated into the liquid crystal display panel 103 to drive the gate lines, the liquid crystal panel driver 102 does not drive the gate lines of the liquid crystal display panel 103, but may supply a control signal to the GIP circuit to control the GIP circuit.

The backlight module 104 lights up a backlight to illuminate the liquid crystal display panel 103.

The saturation expansion circuit (10, 10A to 10C) in the above-mentioned embodiments is integrated in the liquid crystal panel driver 102. Moreover, the liquid crystal panel driver 102 includes a system interface 111, a graphic PAM (random access memory) 112, a source line drive circuit 113, a gray scale voltage generating circuit 114, a liquid crystal drive level generating circuit 115, a control register 116 and a timing generating circuit 117. In one embodiment, the saturation expansion circuit 10 (or 10A to 10C), the system interface 11, the graphic RAM 112, the source line drive circuit 113, the gray scale voltage generation circuit 114, the liquid crystal drive level generating circuit 115, the control register 116 and the timing generating circuit 117 are monolithically integrated on one semiconductor substrate by well-known semiconductor integrated circuit manufacturing techniques.

The system interface 111 supplies the image data received from the control processor 101 to the saturation expansion circuit 10 (or 10A to 10C), and sets a register value in the control register 116 when the register value to be set to the control register 116 is contained in the control data. The saturation expansion circuit 10 (or 10A, 10B, 10C) carries out the above-mentioned saturation expansion processing to the image data received through the system interface 111 and stores the image data after saturation expansion in the graphic RAM 112. The graphic RAM 112 functions as a buffer when the image data after saturation expansion received from the saturation expansion circuit 10 (or 10A, 10B, 10C) is transferred to the source line drive circuit 113. The source line drive circuit 113 drives the source lines of the liquid crystal display panel 103 in response to the image data after saturation expansion received from the graphic RAM 112. The gray-scale voltage generating circuit 114 generates gray scale voltages used in the source line drive circuit 113.

The liquid crystal drive level generating circuit 115 generates a gate signal for driving the gate lines of the liquid crystal display panel 103 and drives a counter electrode (common electrode) of the liquid crystal display panel 103 to a common voltage VCOM. The control register 116 holds and supplies the register value received through the system interface 111 to each block in the liquid crystal panel driver 102. The operation of each block in the liquid crystal panel driver 102 is controlled based on the register value. The timing generating circuit 117 controls the operation timing of each block in the liquid crystal panel driver 102.

In the configuration of FIG. 18, the image data after saturation expansion generated by the saturation expansion circuit 10 (or 10A, 10B, 10C) is stored in the graphic RAM 112. However, instead, as shown in FIG. 19, the image data may be transferred to the graphic RAM 112 from the system interface 111, and the saturation expansion circuit 10 (or 10A, 10B, 10C) may carry out the saturation expansion processing to the image data read from the graphic RAM 112.

A set value that is used in the saturation expansion circuit 10 (or 10A, 10B, 10C) may be held by the control register 116. For example, a part of the control register 116 may be used as the initial color area vertex coordinate register 13a and the user target color area vertex coordinate register 13b in the saturation expansion rate calculating section 13. Also, a value of the weighting coefficient β that is used for the calculation of the weighted average of the value component V and the brightness Y in the second embodiment may be held by the control register 116.

Also, in the above-mentioned embodiments, the saturation expansion rate k is calculated by the saturation expansion rate calculating section 13, but a value of the desired saturation expansion rate k may be set to the control register 116. Instead, the value of the coefficient α may be set to the control register 116.

Figure 19:
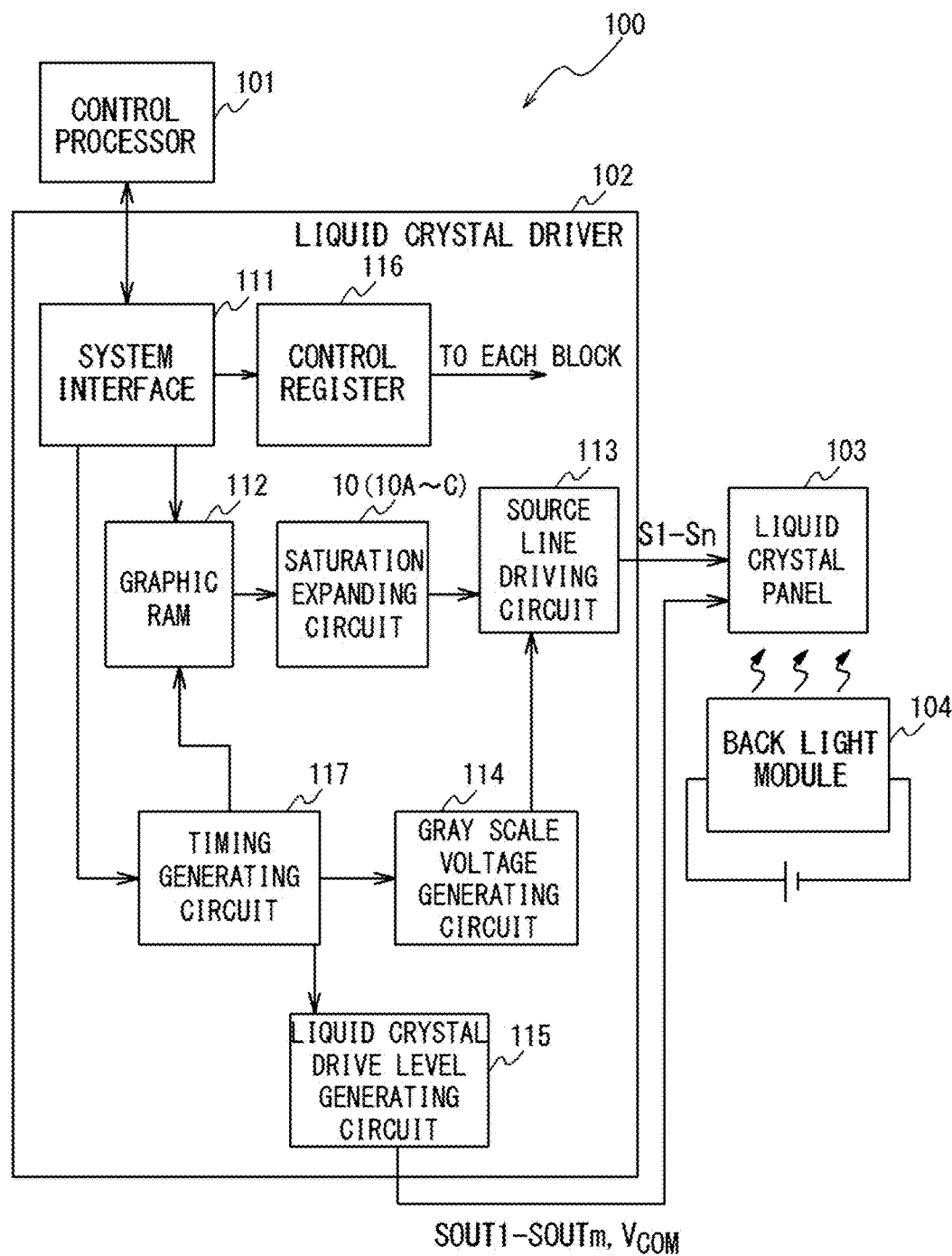
FIG. 19 is a block diagram showing another example of the configuration of the liquid crystal display apparatus that contains the liquid crystal panel driver having the saturation expansion circuit according to the embodiments of the present invention.

Note that in the configuration of the liquid crystal panel driver 102 of FIG. 18 and FIG. 19, the configuration when saturation expansion processing is carried out to the image data is shown. However, the image processing except the saturation expansion processing (e.g. contrast emphasis, gamma correction) may be carried out. In this case, the image processing may be carried out to the image data that is supplied to the saturation expansion circuit 10 (or 10A, 10B, 10C) and may be carried out to the image data after saturation expansion output from the saturation expansion circuit 10 (or 10A, 10B, 10C).

In the above, the embodiments of the present invention have been specifically described. However, the present invention is not limited to the above-mentioned embodiments. It could be easily understood by a person skilled in the art that various modifications are possible in a range that does not deviate from the features.

For example, the saturation expansion circuit (10, 10A to 10C) of the above-mentioned embodiments is integrated in the liquid crystal panel driver 102 that drives the liquid crystal display panel 103 in FIG. 18 and FIG. 19. However, the saturation expansion circuit (10, 10A to 10C) of the above-mentioned embodiments may be integrated in the display panel driver that drives another display panel.

What is claimed is:

1. An image processing apparatus, comprising:
a reference value calculating circuit configured to receive an input signal that includes original RGB data and generate a reference signal that includes a value that is a weighted average of values of R data, G data, and B data of the original RGB data as a reference value;
a first operation circuit configured to receive the input signal and the reference signal, calculate a first value comprising R data of RGB data after saturation expansion, the first value being coincident with a value obtained by adding the value of the R data of the original RGB data to a product of a first difference obtained by subtracting the reference value from the value of the R data of the original RGB data and a coefficient, and provide a first output signal that includes the first value;
a second operation circuit configured to receive the input signal and the reference signal, calculate a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient, and provide a second output signal that includes the second value; and
a third operation circuit configured to receive the input signal and the reference signal, calculate a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient, and provide a third signal that includes the third value.

2. The image processing apparatus according to claim 1, wherein the reference value is a brightness calculated from the R data, the G data, and the B data of the original RGB data.

3. The image processing apparatus according to claim 1, wherein the reference value is calculated as a weighted average of a brightness calculated from the R data, the G data, and the B data of the original RGB data and a maximum value of the R data, the G data, and the B data of the original RGB data.

4. The image processing apparatus according to claim 1, further comprising:
a saturation expansion rate calculating section configured to generate the coefficient based on a register value set by a user.

5. The image processing apparatus according to claim 1, wherein the coefficient is calculated as a value obtained by subtracting "1" from a saturation expansion rate.

6. The image processing apparatus according to claim 1, further comprising:
a saturation expansion rate calculating section configured to calculate a saturation expansion rate in response to a register value set by a user; and
a subtractor configured to subtract "1" from the saturation expansion rate.

7. The image processing apparatus according to claim 1, further comprising:
a saturation expansion rate calculating section configured to calculate a basis saturation expansion rate k in response to a register value set by a user;
a first upper limit value calculating section configured to calculate a basis saturation expansion rate upper limit value $k_{MAX\_OVER}$ from an upper limit value $RGB_{13}$ MAX of the R data, the G data, and the B data of the original RGB data, a maximum value component V of the R data, the G data, and the B data of the original RGB data, and the reference value by using the following equation (1):

$$k_{MAX\_OVER} = 1 + \frac{RGB\_MAX - V}{V - C} \quad (1)$$

where C is the reference value;
a second upper limit value calculating section configured to calculate a second saturation expansion rate upper limit value $k_{MAX\_UNDER}$ from a minimum value MIN of the R data, the G data, the B data of the original RGB data and the reference value C by using the following equation (2):

$$k_{MAX\_UNDER} = 1 + \frac{MIN}{C - MIN} \quad (2)$$

and
a selecting section configured to select a minimum value of the first saturation expansion rate k, the first saturation expansion rate upper limit value $k_{MAX\_OVER}$ and the second saturation expansion rate upper limit value $k_{MAX\_UNDER}$ as a second saturation expansion rate,
wherein the coefficient is calculated as a value obtained by subtracting "1" from the second saturation expansion rate.

8. The image processing apparatus according to claim 1, further comprising:
a saturation expansion rate calculating section configured to calculate a first saturation expansion rate k in response to a register value set by a user;
a first upper limit value calculating section configured to calculate a first saturation expansion rate upper limit value MAX_OVER from an upper limit value RGB_MAX of the R data, the G data, and the B data of the original RGB data, a maximum value of the R data, the G data, and the B data of the original RGB data, and the reference value by using the following equation (3)

$$k_{MAX\_OVER} = 1 + \frac{RGB\_MAX - V}{V - C} \quad (3)$$

where C is the reference value; and
a selecting section configured to select a smaller one of the first saturation expansion rate k and the first saturation expansion rate upper limit value $k_{MAX\_OVER}$ as a second saturation expansion rate,
wherein the coefficient is calculated as a value obtained by subtracting "1" from the second saturation expansion rate.

9. A display panel driver used to drive a display panel, comprising:
a saturation expansion circuit configured to carry out saturation expansion processing to original RGB data to generate RGB data after saturation expansion; and
a drive circuit section configured to drive said display panel in response to the RGB data after saturation expansion,
wherein said saturation expansion circuit comprises:
a reference value calculating circuit configured to generate a value that is a weighted average of values of R data, G data, and B data of the original RGB data, as a reference value;
a first operation section configured to calculate a first value comprising R data of the RGB data after saturation expansion, the first value being coincident with a value obtained by adding the value of the R data of the original RGB data to a product of a first difference obtained by subtracting the reference value from the value of the R data of the original RGB data and a predetermined coefficient;
a second operation section configured to calculate a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient; and
a third operation section configured to calculate a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient.

10. The display panel driver according to claim 9, wherein the reference value is a brightness calculated from the R data, the G data, and the B data of the original RGB data.

11. The display panel driver according to claim 9, wherein the reference value is calculated as a weighted average of a brightness calculated from the R data, the G data, and the B data of the original RGB data and a maximum value of the R data, the G data, and the B data of the original RGB data.

12. The display panel driver according to claim 9, further comprising:
a coefficient generating section configured to generate the coefficient based on a register value set by a user.

13. The display panel driver according to claim 9, further comprising:
a coefficient generating section configured to calculate the coefficient as a value obtained by subtracting "1" from the saturation expansion rate.

14. The display panel driver according to claim 9, further comprising:
a saturation expansion rate generating section configured to calculate a saturation expansion rate in response to a register value set by a user; and
a subtractor configured to calculate the coefficient as a value obtained by subtracting "1" from the saturation expansion rate.

15. The display panel driver according to claim 9, further comprising:
a saturation expansion rate generating section configured to calculate a first saturation expansion rate k in response to a register value set by a user;
a first upper limit value calculating section configured to calculate a first saturation expansion rate upper limit value $k_{MAX\_OVER}$ from an upper limit value RGB_MAX of the R data, the G data, and the B data of the original RGB data, a maximum value component V of the R data, the G data, and the B data of the original RGB data, and the reference value by using the following equation (4):

$$k_{MAX\_OVER} = 1 + \frac{RGB\_MAX - V}{V - C} \quad (4)$$

where C is the reference value;
a second upper limit value calculating section configured to calculate a second saturation expansion rate upper limit value $k_{MAX\_UNDER}$ from a minimum value MIN of the R data, the G data, the B data of the original RGB data and the reference value C by using the following equation (5):

$$k_{MAX\_UNDER} = 1 + \frac{MIN}{C - MIN} \quad (5)$$

and
a selecting section configured to select a minimum value of the first saturation expansion rate k, the first saturation expansion rate upper limit value $k_{MAX\_OVER}$ and the second saturation expansion rate upper limit value $k_{MAX\_UNDER}$ as a second saturation expansion rate,
wherein the coefficient is calculated as a value obtained by subtracting "1" from the second saturation expansion rate.

16. The display panel driver according to claim 9, further comprising:
a saturation expansion rate calculating section configured to calculate a first saturation expansion rate k in response to a register value set by a user;
an upper limit value calculating section configured to calculate a first saturation expansion rate upper limit value $k_{MAX\_OVER}$ from an upper limit value RGB_MAX of the R data, the G data, and the B data of the original RGB data, a maximum value of the R data, the G data, and the B data of the original RGB data, and the reference value by using the following equation (6)

$$k_{MAX\_OVER} = 1 + \frac{RGB\_MAX - V}{V - C} \quad (6)$$

where C is the reference value; and
a selecting section configured to select a smaller one of the first saturation expansion rate k and the first saturation expansion rate upper limit value $k_{MAX\_OVER}$ as a second saturation expansion rate,
wherein the coefficient is calculated as a value obtained by subtracting "1" from the second saturation expansion rate.

17. A display apparatus, comprising:
a display panel; and
a display panel driver configured to drive said display panel,
wherein said display panel driver comprises:
a saturation expansion circuit configured to carry out saturation expansion processing to original RGB data to generate RGB data after saturation expansion; and
a drive circuit section configured to drive said display panel in response to the RGB data after saturation expansion,
wherein said saturation expansion circuit comprises:
a reference value calculating circuit configured to generate a value which is a weighted average of values of R data, G data, and B data of the original RGB data as a reference value;
a first operation section configured to calculate a first value comprising R data of the RGB data after saturation expansion, the first value being coincident with a value obtained by adding the value of the R data of the original RGB data to a product of a first difference obtained by subtracting the reference value from the value of the R data of the original RGB data and a predetermined coefficient;
a second operation section configured to calculate a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient; and
a third operation section configured to calculate a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient; and
wherein the display panel driver is configured to drive the display panel with signals generated in response to the first, second, and third values to display an image based on the RGB data after saturation expansion.

18. A method of driving a display panel, comprising:
generating a value that is a weighted average of values of R data, G data, and B data of original RGB data, as a reference value;
calculating a first value comprising R data of RGB data after saturation expansion, the first value being coincident with a value obtained by adding the value of the R data of the original RGB data to a product of a first difference obtained by subtracting the reference value from the value of the R data of the original RGB data and a predetermined coefficient;
calculating a second value comprising G data of the RGB data after saturation expansion, the second value being coincident with a value obtained by adding the value of the G data of the original RGB data to a product of a second difference obtained by subtracting the reference value from the value of the G data of the original RGB data and the coefficient;

calculating a third value comprising B data of the RGB data after saturation expansion, the third value being coincident with a value obtained by adding the value of the B data of the original RGB data to a product of a third difference obtained by subtracting the reference value from the value of the B data of the original RGB data and the coefficient; and driving the display panel with signals generated in response to the first, second, and third values to display an image based on the RGB data after saturation expansion.

19. The method according to claim 18,
wherein the reference value is a brightness calculated from the R data, the G data, and the B data of the original RGB data.

20. The method according to claim 18,
wherein the reference value is calculated as a brightness calculated from the R data, the G data, and the B data of the original RGB data and a maximum value of the R data, the G data, and the B data of the original RGB data.

* * * * *